(12) United States Patent
Kim et al.

(10) Patent No.: US 9,112,203 B2
(45) Date of Patent: Aug. 18, 2015

(54) POLYMER, A METHOD OF PREPARING THE SAME, COMPOSITE PREPARED FROM THE POLYMER, AND ELECTRODE AND COMPOSITE MEMBRANE EACH INCLUDING THE POLYMER OR THE COMPOSITE

(71) Applicants: Samsung Electronics Co., Ltd., Suwon-si, Gyeonggi-do (KR); Seoul National University R&DB Foundation, Seoul (KR)

(72) Inventors: Ki-hyun Kim, Seoul (KR); Pil-won Heo, Yongin-si (KR); Chan-ho Pak, Seoul (KR); Jong-chan Lee, Seoul (KR); Kihyun Kim, Seoul (KR); Sung-kon Kim, Seoul (KR)

(73) Assignees: SAMSUNG ELECTRONICS CO., LTD. (KR); SEOUL NATIONAL UNIVERSITY R&DB FOUNDATION (KR)

(*) Notice: Subject to any disclaimer, the term of this patent is extended or adjusted under 35 U.S.C. 154(b) by 105 days.

(21) Appl. No.: 14/067,288

(22) Filed: Oct. 30, 2013

(65) Prior Publication Data
US 2014/0194581 A1    Jul. 10, 2014

(30) Foreign Application Priority Data

Jan. 10, 2013  (KR) .......................... 10-2013-0003140

(51) Int. Cl.
*H01M 8/10* (2006.01)
*H01M 4/62* (2006.01)

(52) U.S. Cl.
CPC ............ *H01M 8/1034* (2013.01); *H01M 4/622* (2013.01); *H01M 8/1027* (2013.01); *Y02E 60/521* (2013.01)

(58) Field of Classification Search
CPC .................................................. H01M 8/1034
USPC ...................................................... 525/537
See application file for complete search history.

(56) References Cited

U.S. PATENT DOCUMENTS

| | | | |
|---|---|---|---|
| 8,227,138 B2* | 7/2012 | Choi et al. ................. | 429/491 |
| 8,378,054 B2 | 2/2013 | Weber et al. | |
| 8,802,320 B2* | 8/2014 | Choi et al. ................. | 429/493 |
| 8,936,887 B2* | 1/2015 | Choi et al. ................. | 429/477 |
| 2006/0036064 A1* | 2/2006 | McGrath et al. ............ | 528/373 |
| 2006/0241192 A1* | 10/2006 | Kitamura et al. ........... | 521/27 |
| 2007/0275285 A1* | 11/2007 | Choi et al. ................. | 429/30 |
| 2008/0063917 A1* | 3/2008 | Yamashita et al. .......... | 429/33 |
| 2009/0123805 A1* | 5/2009 | Choi et al. ................. | 429/33 |
| 2010/0047660 A1 | 2/2010 | Geormezi et al. | |
| 2011/0065021 A1* | 3/2011 | Kitamura et al. ........... | 429/494 |
| 2011/0281200 A1* | 11/2011 | Choi et al. ................. | 429/492 |
| 2012/0107725 A1* | 5/2012 | Akashi et al. .............. | 429/493 |
| 2012/0129076 A1* | 5/2012 | Ichimura et al. ........... | 429/493 |

FOREIGN PATENT DOCUMENTS

| | | | | | |
|---|---|---|---|---|---|
| EP | 2202261 A1 | * | 6/2010 | ............ | C08G 83/00 |
| EP | 2253654 A1 | * | 11/2010 | ............ | C08G 73/18 |
| KR | 10-2010-0100863 A | | 9/2010 | | |
| WO | 2009/062923 A3 | | 5/2009 | | |

OTHER PUBLICATIONS

C. Zhang et al., Synthesis and characterization of sulfonated poly(arylene ether phosphine oxide)s with fluorenyl groups by direct polymerization for proton exchange membranes, Journal of Membrane Science 329 (2009) pp. 99-105.
E.K. Pefkianakis et al., Blends of Aromatic Polyethers Bearing Polar Pyridine Units and Their Evaluation as High Temperature Polymer Electrolytes, Macromol. Symp. 2009, 279, pp. 183-190.
K.B. Wiles et al., Disulfonated Poly(Arylene Ether Phenyl Phosphine Oxide Sulfone) Terpolymers for PEM Fuel Cell Systems, Prepr. Pap.—Am. Chem. Soc., Div. Fuel Chem. 2004, 49(2), 548.
Y.S. Kim, et al., Structure-property-performance relationships of sulfonated poly(arylene ether suflone)s as a polymer electrolyte for fuel cell applications, Science Direct, Polymer 47 (2006), pp. 4026-4035.

\* cited by examiner

*Primary Examiner* — Mike M Dollinger
(74) *Attorney, Agent, or Firm* — Cantor Colburn LLP

(57) ABSTRACT

A polymer comprising a first repeating unit represented by Formula 1:

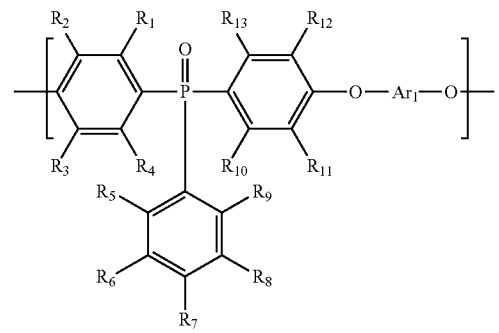

Formula 1 wherein $R_1$ to $R_{13}$ and $Ar_1$ in Formula 1 are defined in the specification.

6 Claims, 11 Drawing Sheets

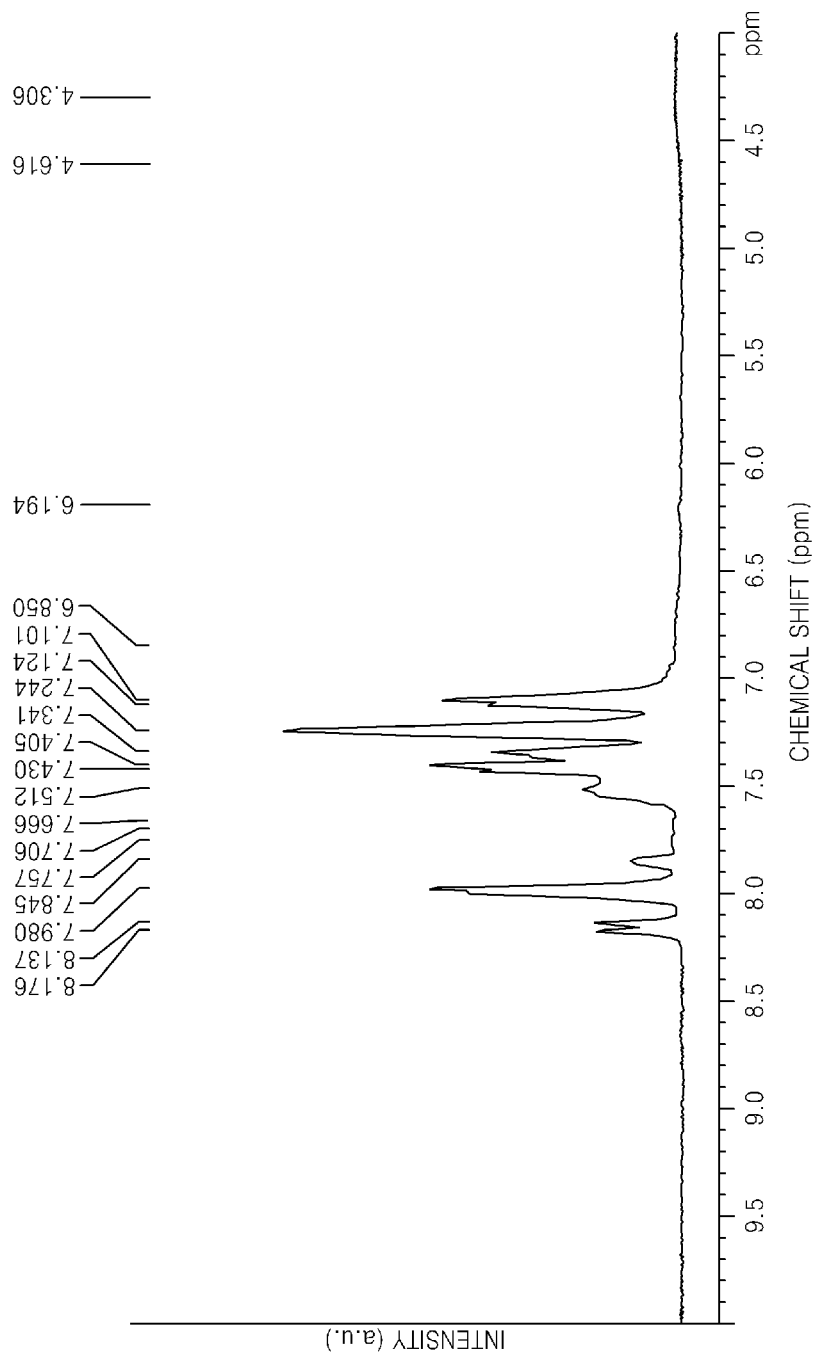

POLYMER, A METHOD OF PREPARING THE SAME, COMPOSITE PREPARED FROM THE POLYMER, AND ELECTRODE AND COMPOSITE MEMBRANE EACH INCLUDING THE POLYMER OR THE COMPOSITE

CROSS-REFERENCE TO RELATED APPLICATIONS

This application claims priority to and the benefit of Korean Patent Application No. 10-2013-0003140, filed on Jan. 10, 2013, and all the benefits accruing therefrom under 35 U.S.C. §119, the content of which is incorporated herein in its entirety by reference.

BACKGROUND

1. Field

The present disclosure relates to a polymer, a method of preparing the same, a composite prepared from the polymer, and an electrode and a composite membrane, each including the polymer or the composite.

2. Description of the Related Art

According to the types of electrolyte and fuel used, fuel cells can be classified as polymer electrolyte membrane fuel cells ("PEMFCs"), direct methanol fuel cells ("DMFCs"), phosphoric acid fuel cells ("PAFCs"), molten carbonate fuel cells ("MCFCs"), or solid oxide fuel cells ("SOFCs").

PEMFCs operating at 100° C. or higher temperatures in non-humidified conditions, as compared to those operable at low temperatures, do not require a humidifier, and are known to be convenient in terms of control of water supply and highly reliable in terms of system operation. Furthermore, such high-temperature PEMFCs may become more durable against carbon monoxide (CO) poisoning that may occur in fuel electrodes. Thus, a simplified reformer may be used therefor. Due to these advantages, PEMFCs operable at medium and high temperatures in non-humidified conditions are increasingly drawing attention.

Along with the current trends for increasing the operation temperature of PEMPCs as described above, fuel cells operable at medium and high temperatures are drawing more attention.

However, thermal stability, ionic conductivity, and mechanical characteristics of the electrolyte membranes for fuel cells developed so far are not satisfactory. Thus, there is a demand for electrolyte membranes having improved performance.

SUMMARY

Provided are a polymer, a method of preparing the same, a composite prepared from the polymer, an electrode, and a composite membrane, each including the polymer or the composite having improved performance.

Additional aspects will be set forth in part in the description which follows and, in part, will be apparent from the description, or may be learned by practice of the presented embodiments.

According to an aspect, a polymer includes a first repeating unit represented by Formula 1 below:

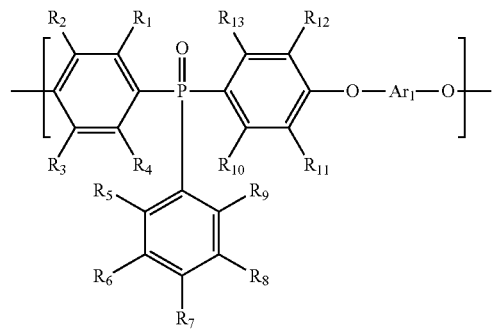

Formula 1 wherein, in Formula 1,
at least one of $R_1$ to $R_{13}$ is a proton-conducting group, and the remaining $R_1$ to $R_{13}$ are each independently selected from a hydrogen atom, a substituted or unsubstituted C1-C40 alkyl group, a substituted or unsubstituted C1-C40 alkoxy group, a substituted or unsubstituted C2-C40 alkenyl group, a substituted or unsubstituted C2-C40 alkynyl group, a substituted or unsubstituted C6-C40 aryl group, a substituted or unsubstituted C7-C40 arylalkyl group, a substituted or unsubstituted C6-C40 aryloxy group, a substituted or unsubstituted C2-C40 heteroaryl group, a substituted or unsubstituted C3-C40 heteroarylalkyl group, a substituted or unsubstituted C2-C40 heteroaryloxy group, a substituted or unsubstituted C4-C40 carbocyclic group, a substituted or unsubstituted C5-C40 carbocyclic alkyl group, a substituted or unsubstituted C4-C40 carbocyclic oxy group, a substituted or unsubstituted C5-C40 carbocyclic alkyloxy group, a substituted or unsubstituted C2-C40 heterocyclic group, a halogen atom, a hydroxy group, and a cyano group, and
$Ar_1$ is a substituted or unsubstituted C6-C40 arylene group, a substituted or unsubstituted C7-C40 arylalkylene group, a substituted or unsubstituted C6-C40 arylene oxy group, a substituted or unsubstituted C7-C40 arylalkylene oxy group, a substituted or unsubstituted C2-C40 heteroarylene group, a substituted or unsubstituted C3-C40 heteroarylalkylene group, a substituted or unsubstituted C2-C40 heteroarylene oxy group, a substituted or unsubstituted C2-C40 heteroarylalkylene oxy group, a substituted or unsubstituted C4-C40 carbocyclic group, a substituted or unsubstituted C5-C40 carbocyclic alkylene group, a substituted or unsubstituted C4-C40 carbocyclic oxy group, or a substituted or unsubstituted C4-C40 carbocyclic alkylene oxy group.

According to another aspect, a composite membrane includes the above-defined polymer.

According to another aspect, there is provided a composite, which is a polymerization product of a composition including the above-defined polymer and at least one selected from compounds represented by Formulae 14 to 19:

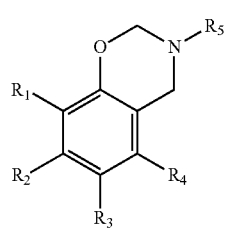

Formula 14 wherein, in Formula 14,

R₁, R₂, R₃, and R₄ are each independently a hydrogen atom, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C2-C20 heteroaryl group, a substituted or unsubstituted C2-C20 heteroaryloxy group, a substituted or unsubstituted C4-C20 carbocyclic group, a substituted or unsubstituted C4-C20 carbocyclic oxy group, a substituted or unsubstituted C2-C20 heterocyclic group, a halogen atom, a hydroxy group, or a cyano group; and R₅ is a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, or a substituted or unsubstituted C2-C20 heterocyclic alkyl group,

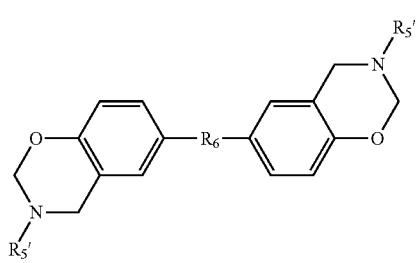

Formula 15 wherein, in Formula 15,

R₅' is a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, or a substituted or unsubstituted C2-C20 heterocyclic alkyl group; and R₆ is selected from a substituted or unsubstituted C1-C20 alkylene group, a substituted or unsubstituted C2-C20 alkenylene group, a substituted or unsubstituted C2-C20 alkynylene group, a substituted or unsubstituted C6-C20 arylene group, a substituted or unsubstituted C2-C20 heteroarylene group, —C(=O)—, and —SO₂—,

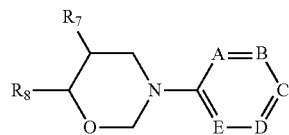

Formula 16 wherein, in Formula 16,

A, B, C, D, and E are carbon atoms; or one or two of A, B, C, D, and E are nitrogen atoms, and the remaining A, B, C, D, and E are carbon atoms, R₇ and R₈ are linked to each other to form a ring, wherein the ring is a C6-C10 cycloalkyl group, a C3-C10 heteroaryl group, a fused C3-C10 heteroaryl group, a C3-C10 heterocyclic group, or a fused C3-C10 heterocyclic group,

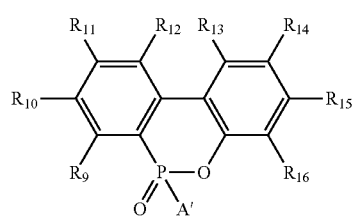

Formula 17 wherein, in Formula 17,

A' is a substituted or unsubstituted C1-C20 heterocyclic group, a substituted or unsubstituted C4-C20 cycloalkyl group, or a substituted or unsubstituted C1-C20 alkyl group; and R₉ to R₁₆ are each independently a hydrogen atom, C1-C20 alkyl group, a C1-C20 alkoxy group, a C6-C20 aryl group, a C6-C20 aryloxy group, a C1-C20 heteroaryl group, a C1-C20 heteroaryloxy group, a C4-C20 cycloalkyl group, a C1-C20 heterocyclic group, a halogen atom, a cyano group, or a hydroxy group,

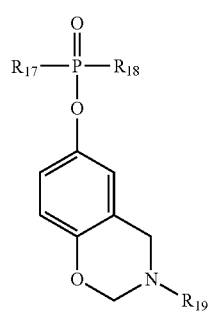

Formula 18 wherein, in Formula 18,

R₁₇ and R₁₈ are each independently a C1-C20 alkyl group, a C1-C20 alkoxy group, a C6-C20 aryl group, a C6-C20 aryloxy group, or a group represented by Formula 8A, Formula 18a

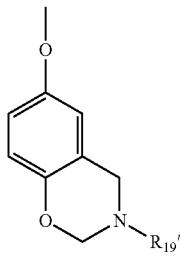

wherein, in Formulae 18 and 18a, $R_{19}$ and $R_{19'}$ are each independently a hydrogen atom, a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 cycloalkyl group, a halogenated C4-C20 cycloalkyl group, a C1-C20 heterocyclic group, or a halogenated C1-C20 heterocyclic group, Formula 19

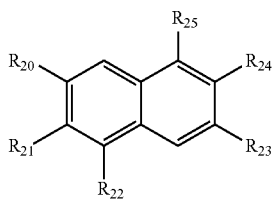

wherein, in Formula 19, at least two groups selected from $R_{20}$, $R_{21}$, and $R_{22}$ are linked to each other to form a group represented by Formula 19a, the remaining $R_{20}$, $R_{21}$, and $R_{22}$ are each independently a hydrogen atom, a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 carbocyclic group, a halogenated C4-C20 carbocyclic group, a C1-C20 heterocyclic group, or a halogenated C1-C20 heterocyclic group, at least two adjacent groups selected from $R_{23}$, $R_{24}$, and $R_{25}$ are linked to each other to form a group represented by Formula 19a, and the remaining $R_{23}$, $R_{24}$, and $R_{25}$ are each independently a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 carbocyclic group, a halogenated C4-C20 carbocyclic group, a C1-C20 heterocyclic group, or a halogenated C1-C20 heterocyclic group, Formula 19a

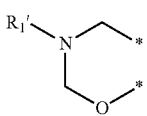

wherein, in Formula 19a, $R_1'$ is a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbocyclic group, a substituted or unsubstituted C4-C20 carbocyclic alkyl group, a substituted or unsubstituted C2-C20 heterocylic group, or a substituted or unsubstituted C2-C20 heterocyclic alkyl group, and

* indicates a binding site to at least two adjacent groups of $R_{20}$, $R_{21}$, and $R_{22}$ in Formula 19, and a binding site to at least two adjacent groups of $R_{23}$, $R_{24}$, and $R_{25}$ in Formula 19.

According to another aspect, an electrode includes the above-defined polymer or the above-defined composite.

According to another aspect, a composite membrane includes the above-defined polymer or the above-defined composite.

According to another aspect, a method of preparing the above-defined polymer comprises:

reacting a compound represented by Formula 9 and a compound represented by Formula 10 to prepare the above-defined polymer:

Formula 9

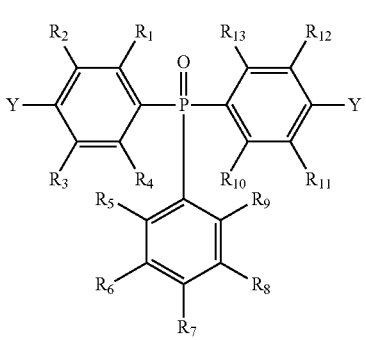

wherein in Formula 9, at least one of $R_1$ to $R_{13}$ is a proton-conducting group, and the remaining $R_1$ to $R_{13}$ are each independently selected from a hydrogen atom, a substituted or unsubstituted C1-C40 alkyl group, a substituted or unsubstituted C1-C40 alkoxy group, a substituted or unsubstituted C2-C40 alkenyl group, a substituted or unsubstituted C2-C40 alkynyl group, a substituted or unsubstituted C6-C40 aryl group, a substituted or unsubstituted C7-C40 arylalkyl group, a substituted or unsubstituted C6-C40 aryloxy group, a substituted or unsubstituted C2-C40 heteroaryl group, a substituted or unsubstituted C3-C40 heteroarylalkyl group, a substituted or unsubstituted C2-C40 heteroaryloxy group, a substituted or unsubstituted C4-C40 carbocyclic group, a substituted or unsubstituted C5-C40 carbocyclic alkyl group, a substituted or unsubstituted C4-C40 carbocyclic oxy group, a substituted or unsubstituted C5-C40 carbocyclic alkyloxy group, a substituted or unsubstituted C2-C40 heterocyclic group, a halogen atom, a hydroxy group, and a cyano group; and Y is a halogen atom,

 Formula 10 wherein, in Formula 10, $Ar_1$ is a substituted or unsubstituted C6-C40 arylene group, a substituted or unsubstituted C7-C40 arylalkylene group, a substituted or unsubstituted C6-C40 arylene oxy group, a substituted or unsubstituted C7-C40 arylalkylene oxy group, a substituted or unsubstituted C2-C40 heteroarylene group, a substituted or unsubstituted C3-C40 heteroarylalkylene group, a substituted or unsubstituted C2-C40 heteroarylene oxy group, a substituted or unsubstituted C2-C40 heteroarylalkylene oxy group, a substituted or unsubstituted C4-C40 carbocyclic group, a substituted or unsubstituted C5-C40 carbocyclic alkylene group, a substituted or unsubstituted C4-C40 carbocyclic oxy group, or a substituted or unsubstituted C4-C40 carbocyclic alkylene oxy group.

BRIEF DESCRIPTION OF THE DRAWINGS

These and/or other aspects will become apparent and more readily appreciated from the following description of the embodiments, taken in conjunction with the accompanying drawings of which:

FIGS. 5 to 12 are graphs of intensity (arbitrary units, a.u.) versus chemical shift (parts per million, ppm) representing proton nuclear magnetic resonance spectra ("$^1$H-NMR") of polymers of Preparation Examples 1 to 8.

DETAILED DESCRIPTION

Figure 1:
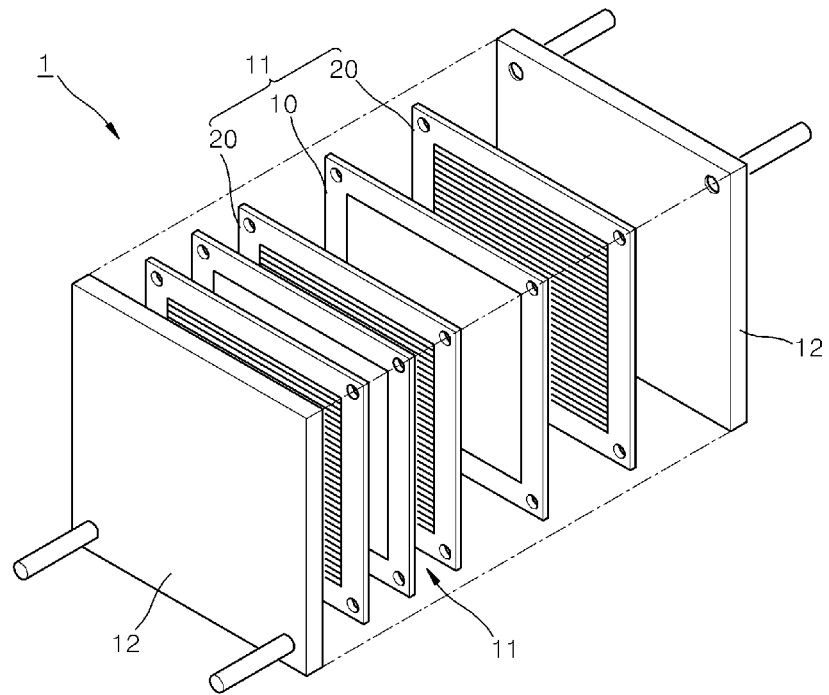
FIG. 1 is a perspective exploded view of a fuel cell according to an embodiment.

Reference will now be made in detail to embodiments a polymer, a method of preparing the same, a composite prepared from the polymer, an electrode and a composite membrane each including the composite, and a fuel cell including at least selected from the electrode and the composite membrane, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

According to an embodiment, there is provided a polymer including a first repeating unit represented by Formula 1 below:

Formula 1

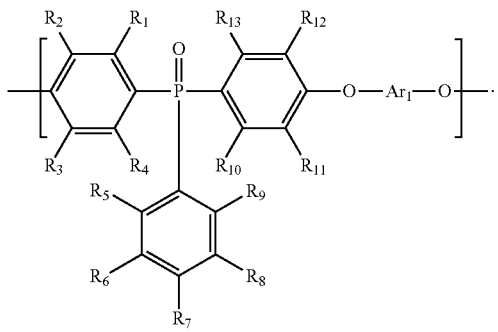

In Formula 1,
at least one of $R_1$ to $R_{13}$ is a proton-conducting group, and the remaining $R_1$ to $R_{13}$ are each independently selected from a hydrogen atom, a substituted or unsubstituted C1-C40 alkyl group, a substituted or unsubstituted C1-C40 alkoxy group, a substituted or unsubstituted C2-C40 alkenyl group, a substituted or unsubstituted C2-C40 alkynyl group, a substituted or unsubstituted C6-C40 aryl group, a substituted or unsubstituted C7-C40 arylalkyl group, a substituted or unsubstituted C6-C40 aryloxy group, a substituted or unsubstituted C2-C40 heteroaryl group, a substituted or unsubstituted C3-C40 heteroarylalkyl group, a substituted or unsubstituted C2-C40 heteroaryloxy group, a substituted or unsubstituted C4-C40 carbocyclic group, a substituted or unsubstituted C5-C40 carbocyclic alkyl group, a substituted or unsubstituted C4-C40 carbocyclic oxy group, a substituted or unsubstituted C5-C40 carbocyclic alkyloxy group, a substituted or unsubstituted C2-C40 heterocyclic group, a halogen atom, a hydroxy group, and a cyano group, and $Ar_1$ is a substituted or unsubstituted C6-C40 arylene group, a substituted or unsubstituted C7-C40 arylalkylene group, a substituted or unsubstituted C6-C40 arylene oxy group, a substituted or unsubstituted C7-C40 arylalkylene oxy group, a substituted or unsubstituted C2-C40 heteroarylene group, a substituted or unsubstituted C3-C40 heteroarylalkylene group, a substituted or unsubstituted C2-C40 heteroarylene oxy group, a substituted or unsubstituted C2-C40 heteroarylalkylene oxy group, a substituted or unsubstituted C4-C40 carbocyclic group, a substituted or unsubstituted C5-C40 carbocyclic alkylene group, a substituted or unsubstituted C4-C40 carbocyclic oxy group, or a substituted or unsubstituted C4-C40 carbocyclic alkylene oxy group.

The proton-conducting group may be any of various groups known in the art to provide proton conductivity. For example, the proton-conducting group may be at least one of —$SO_2H$, —$CO_2H$, or —$PO_3H$.

In some embodiments, at least three of $R_1$ to $R_{12}$ in Formula 1 may be proton-conducting groups. For example, at least one of $R_1$ to $R_4$, at least one of $R_5$ to $R_9$, and at least one of $R_{10}$ to $R_{12}$ may be proton-conducting groups to provide a polymer having higher conductivity.

In some embodiments, $R_2$, $R_8$, and $R_{11}$ in Formula 1 may all be proton-conducting groups, and the remaining $R_1$ to $R_{13}$ in Formula 1 may all be hydrogen atoms.

In Formula 1, $Ar_1$ is an arylene group or an arylene group including a hetero atom, The terms "arylene group including a hetero atom" indicates a divalent organic group with a linker including a hetero atom between two arylene groups, or an arylene group substituted with a substituent including a hetero atom between two arylene groups. In this regard, the hetero atom indicates at least one selected from sulfur, oxygen, nitrogen, fluorine, and chloride.

For example, the arylene group including a hetero atom, i.e., $Ar_1$ in Formula 1, may be a unit represented by Structural Formula 1 below:

Structural Formula 1

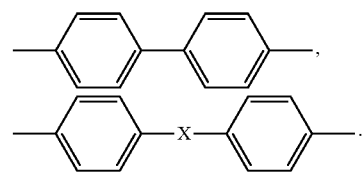

In Formula 1,
X may be —$CH_2$—, —$C(CF_3)_2$—, —$C(=O)$—, —$C(CCl_3)_2$—, —$CH(CF_3)$—, —$S(=O)$—, —$S(=O)_2$—, —$CH(CCl_3)$—, or a group represented by Structural Formula 1a below:

Structural Formula 1a

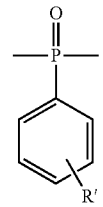

In Structural Formula 1a,
R' is a hydrogen atom, a C1-C40 alkyl group, a C1-C40 alkoxy group, a C2-C40 alkenyl group, a C2-C40 alkynyl group, a C6-C40 aryl group, a C7-C40 arylalkyl group, a C6-C40 aryloxy group, a C2-C40 heteroaryl group, a hydroxy group, a cyano group, or a halogen atom.

According to an embodiment, the polymer includes a repeating unit including an organic phosphine oxide (P(=O) $R_3$, wherein R is an alkyl group or an aryl group) moiety including an alkyl or aryl group. Such a polymer has increased thermal stability. The first repeating unit represented by Formula 1 above includes a proton-conducting group exhibiting high proton conductivity. The first repeating unit may include at least one proton-conducting group, for example, at least three proton conducting groups.

In some embodiments, $Ar_1$ may be a unit represented by Structural Formula 1b below:

Structural Formula 1b

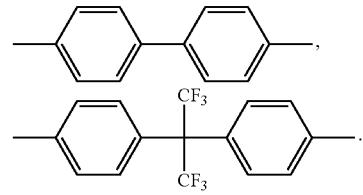

In some other embodiments, the polymer may further include a second repeating unit represented by Formula 2 below.

The first repeating unit and the second repeating unit may each have a mole fraction from about 0.01 to about 0.99, and a sum of the mole fractions of the first repeating unit and the second repeating unit may be equal to 1:

Formula 2

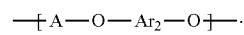

In Formula 2,
A and $Ar_2$ may be each independently a substituted or unsubstituted C6-C40 arylene group, a substituted or unsubstituted C7-C40 arylalkylene group, a substituted or unsubstituted C6-C40 arylene oxy group, a substituted or unsubstituted C7-C40 arylalkylene oxy group, a substituted or unsubstituted C2-C40 heteroarylene group, a substituted or unsubstituted C3-C40 heteroarylalkylene group, a substituted or unsubstituted C2-C40 heteroarylene oxy group, a substituted or unsubstituted C2-C40 heteroarylalkylene oxy group, a substituted or unsubstituted C4-C40 carbocyclic group, a substituted or unsubstituted C5-C40 carbocyclic alkylene group, a substituted or unsubstituted C4-C40 carbocyclic oxy group, or a substituted or unsubstituted C4-C40 carbocyclic alkylene oxy group.

In Formula 2,

A and $Ar_2$ may be each independently an arylene group, or an arylene group including a hetero atom.

In Formula 2,

A and $Ar_2$ may each independently be a unit represented by Structural Formula 2 below:

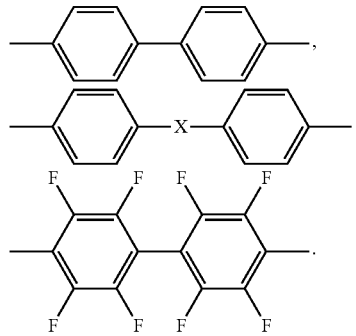

Structural Formula 2

In Structural Formula 2, X may be —$CH_2$—, —$C(CF_3)_2$—, —$C(=O)$—, —$C(CCl_3)_2$—, —$CH(CF_3)$—, —$S(=O)$—, —$S(=O)_2$—, —$P(=O)C_6H_5$—, or —$CH(CCl_3)$—.

In some embodiments, $Ar_2$ in Formula 2 may be a unit represented by Structural Formula 1b below:

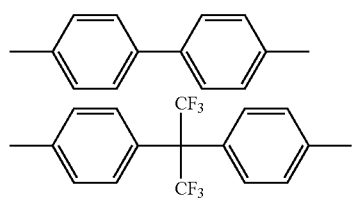

Structural Formula 1b

In other embodiments, A in Formula 2 may be a unit represented by Formula Structural 2a below:

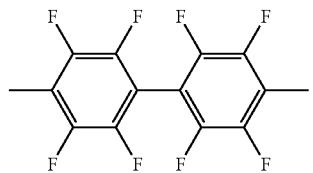

Structural Formula 2a

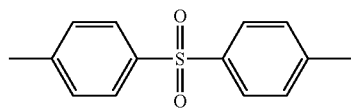

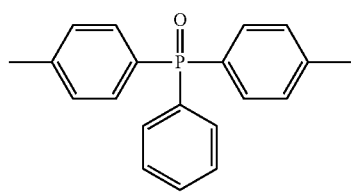

A polymer represented by Formula 2 may be prepared by reacting a compound of Formula 10 below, wherein $Ar_1$ is $Ar_2$ with a compound of Formula 11 below.

In some embodiments, the polymer may have a weight average molecular weight from about 5,000 to about 950,000. When the weight average molecular weight of the polymer is within this range, it may be easier to form a composite membrane due to improved processability without reduction in its thermal stability and mechanical characteristics.

In some embodiments, the polymer may be represented by Formula 3a, Formula 4a, or Formula 5a below:

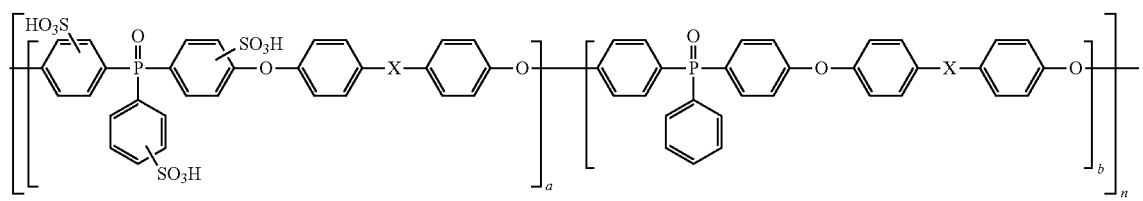

Formula 3a

In Formula 3a,

X may be a chemical bond, —$CH_2$—, —$C(CF_3)_2$—, —$C(=O)$—, —$C(CCl_3)_2$—, —$CH(CF_3)$—, —$S(=O)$—, —$S(=O)_2$—, —$P(=O)C_6H_5$—, or —$CH(CCl_3)$—X;

$0.01 \leq a \leq 0.99$; and $0.01 \leq b \leq 0.99$, wherein $a+b=1$; and n, which is a degree of polymerization, is ranging from about 5 to about 5,000.

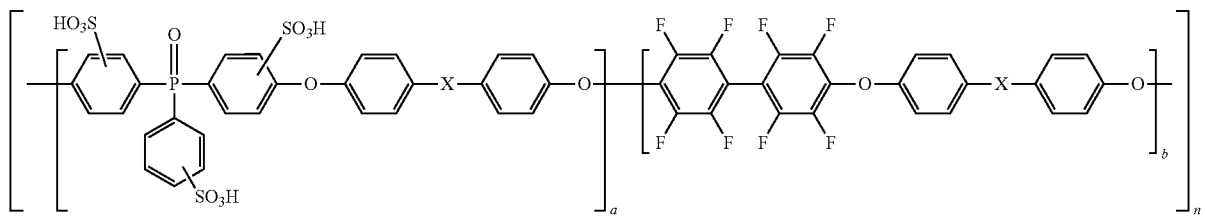

Formula 4a

In Formula 4a,
X may be a chemical bond, —CH$_2$—, —C(CF$_3$)$_2$—, —C(=O)—, —C(CCl$_3$)$_2$—, —CH(CF$_3$)—, —S(=O)—, —S(=O)$_2$—, —P(=O)C$_6$H$_5$— or —CH(CCl$_3$)—;
0.01≤a≤0.99; and
0.01≤b≤0.99,
wherein a+b=1; and
n, which is a degree of polymerization, is ranging from about 5 to about 5,000.

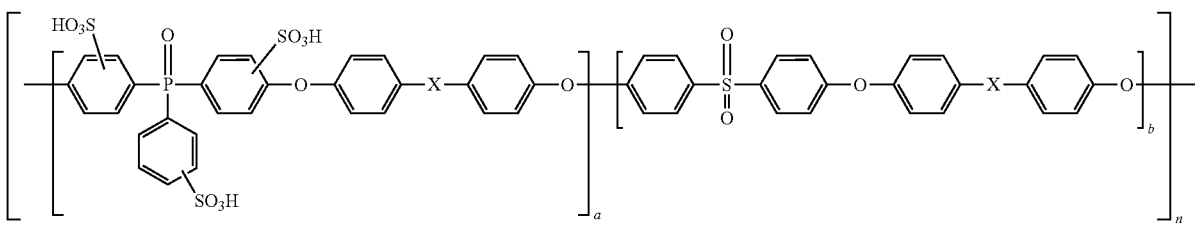

Formula 5a

In Formula 5a,
X is a chemical bond, —CH$_2$—, —C(CF$_3$)$_2$—, —C(=O)—, —C(CCl$_3$)$_2$—, —CH(CF$_3$)—, —S(=O)—, —S(=O)$_2$—, —P(=O)C$_6$H$_5$—, or —CH(CCl$_3$)—;
0.01≤a≤0.99; and
0.01≤b≤0.99,
wherein a+b=1; and
n, which is a degree of polymerization, is ranging from about 5 to about 5,000.

In some other embodiments, the polymer may be a polymer represented by Formula 3, Formula 4, or Formula 5 below:

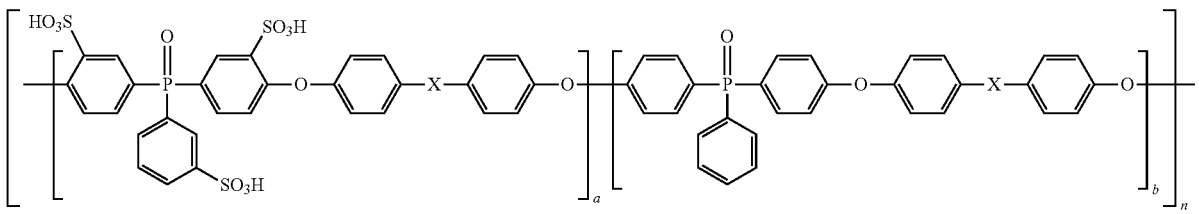

Formula 3

In Formula 3,
X may be a chemical bond, —CH$_2$—, —C(CF$_3$)$_2$—, —C(=O)—, —C(CCl$_3$)$_2$—, —CH(CF$_3$)—, —S(=O)—, —S(=O)$_2$—, —P(=O)C$_6$H$_5$—, or —CH(CCl$_3$)—;
0.01≤a≤0.99; and
0.01≤b≤0.99,
wherein a+b=1; and
n, which is a degree of polymerization, is ranging from about 5 to about 5,000.

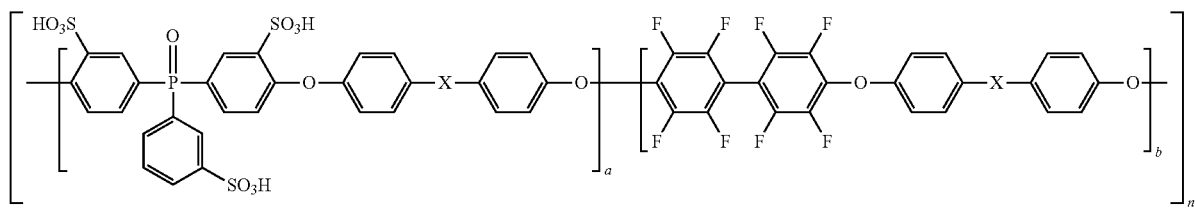

Formula 4

In Formula 4,
X may be a chemical bond, —CH₂—, —C(CF₃)₂—, —C(=O)—, —C(CCl₃)₂—, —CH(CF₃)—, —S(=O)—, —S(=O)₂—, —P(=O)C₆H₅—, or —CH(CCl₃)—;
$0.01 \leq a \leq 0.99$; and
$0.01 \leq b \leq 0.99$,
wherein a+b=1; and
n, which is a degree of polymerization, is ranging from about 5 to about 5,000.

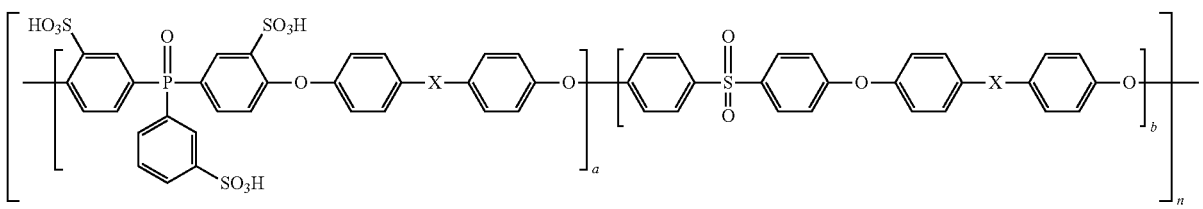

Formula 5

In Formula 5,
X may be a chemical bond, —CH₂—, —C(CF₃)₂—, —C(=O)—, —C(CCl₃)₂—, —CH(CF₃)—, —S(=O)—, —S(=O)₂—, —P(=O)C₆H₅—, or —CH(CCl₃)—;
$0.01 \leq a \leq 0.99$; and
$0.01 \leq b \leq 0.99$,
wherein a+b=1; and
n, which is a degree of polymerization, is ranging from about 5 to about 5,000.

In still other embodiments, the polymer may be represented by Formulae 6, 7, 7a, or 8 below.

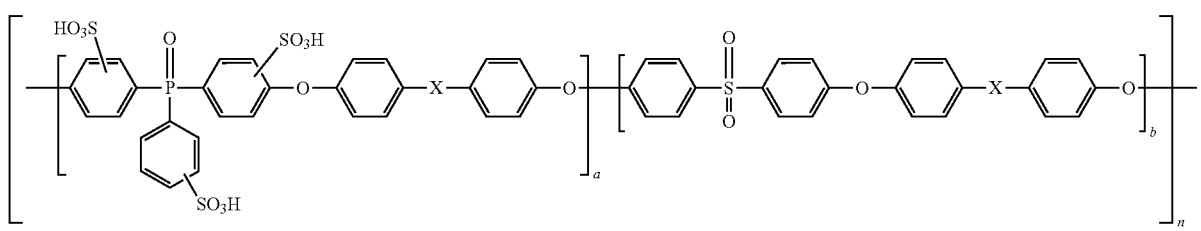

Formula 6

In Formula 6,
$0.01 \leq a \leq 0.99$; and
$0.01 \leq b \leq 0.99$,
wherein a+b=1; and
n, which is a degree of polymerization, is ranging from about 5 to about 5,000.

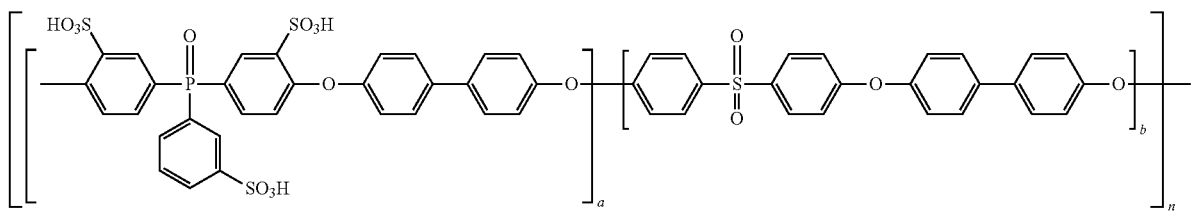

Formula 7

In Formula 7,
0.01≤a≤0.99; and
0.01≤b≤0.99,
wherein a+b=1; and
n, which is a degree of polymerization, is ranging from about 5 to about 5,000.

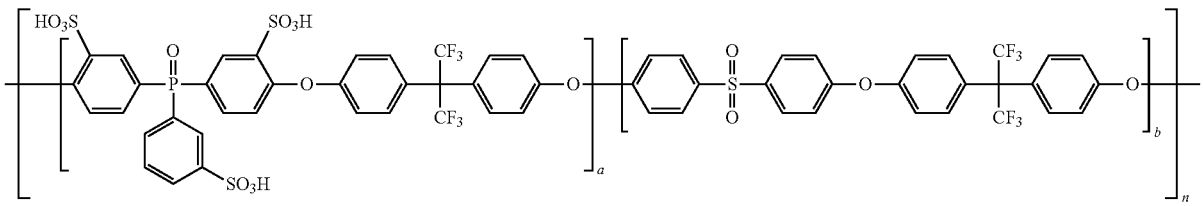

Formula 7a

In Formula 7a,
0.01≤a≤0.99; and
0.01≤b≤0.99,
wherein a+b=1; and
n, which is a degree of polymerization, is ranging from about 5 to about 5,000.

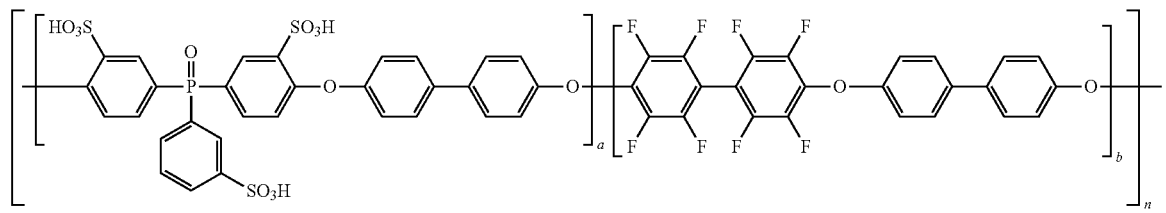

Formula 8

In Formula 8,
0.01≤a≤0.99; and
0.01≤b≤0.99,
wherein a+b=1; and
n, which is a degree of polymerization, is ranging from about 5 to about 5,000.

In some embodiments, a and b may each independently be from about 0.1 to about 0.9. For example, a may be from about 0.1 to about 0.5, and b may be from about 0.5 to about 0.9.

According to another embodiment, a method of preparing a polymer including a first repeating unit of Formula 1 above includes reacting a compound represented by Formula 9 below and a compound represented by Formula 10 below.

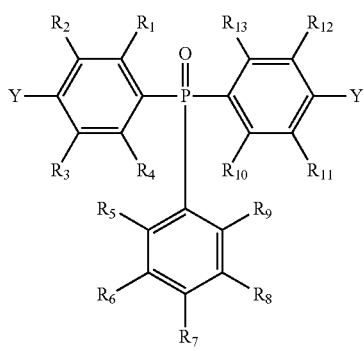

Formula 9

In Formula 9, at least one of $R_1$ to $R_{13}$ is a proton-conducting group, and the remaining $R_1$ to $R_{13}$ are each independently selected from a hydrogen atom, a substituted or unsubstituted C1-C40 alkyl group, a substituted or unsubstituted C1-C40 alkoxy group, a substituted or unsubstituted C2-C40 alkenyl group, a substituted or unsubstituted C2-C40 alkynyl group, a substituted or unsubstituted C6-C40 aryl group, a substituted or unsubstituted C7-C40 arylalkyl group, a substituted or unsubstituted C6-C40 aryloxy group, a substituted or unsubstituted C2-C40 heteroaryl group, a substituted or unsubstituted C3-C40 heteroarylalkyl group, a substituted or unsubstituted C2-C40 heteroaryloxy group, a substituted or unsubstituted C4-C40 carbocyclic group, a substituted or unsubstituted C5-C40 carbocyclic alkyl group, a substituted or unsubstituted C4-C40 carbocyclic oxy group, a substituted or unsubstituted C5-C40 carbocyclic alkyloxy group, a substituted or unsubstituted C2-C40 heterocyclic group, a halogen atom, a hydroxy group, and a cyano group; and Y is a halogen atom.

Formula 10

In Formula 10, $Ar_1$ is a substituted or unsubstituted C6-C40 arylene group, a substituted or unsubstituted C7-C40 arylalkylene group, a substituted or unsubstituted C6-C40 arylene oxy group, a substituted or unsubstituted C7-C40 arylalkylene oxy group, a substituted or unsubstituted C2-C40 heteroarylene group, a substituted or unsubstituted C3-C40 heteroarylalkylene group, a substituted or unsubstituted C2-C40 heteroarylene oxy group, a substituted or unsubstituted C2-C40 heteroarylalkylene oxy group, a substituted or unsubstituted C4-C40 carbocyclic group, a substituted or unsubstituted C5-C40 carbocyclic alkylene group, a substituted or unsubstituted C4-C40 carbocyclic oxy group, or a substituted or unsubstituted C4-C40 carbocyclic alkylene oxy group.

The reacting of the compound of Formula 9 and the compound of Formula 10 may include an azeotropic distillation by primarily thermal-treating the compound of Formula 9 and the compound of Formula 10 with an addition of a base and a solvent at a temperature of about 110° C. to about 165° C.

The base may be potassium carbonate, sodium carbonate, or the like. The base may neutralize and remove an acid component resulting from the reaction.

An amount of the base may be from about 2 moles to about 2.1 moles based on 1 mole of the compound of Formula 10. When the amount of the base is within this range, the acid component as a reaction product may be effectively removed to obtain the polymer with a higher yield.

The solvent may be any solvent able to dissolve the compound of Formula 9 and the compound of Formula 10. Non-limiting examples of the solvent are dichloromethane, chloroform, benzene, toluene, chlorobenzene, methyl acetate, ethyl acetate, γ-butyrolactone, acetone, methyl ethyl ketone, cyclohexanone, ether, 1,2-dimethoxyethane ("DME"), 1,2-diethoxyethane, tetrahydrofuran ("THF"), 1,4-dioxane, a chain-type carbonate (such as dimethyl carbonate, ethyl methyl carbonate, diethyl carbonate, and dipropyl carbonate), a cyclic carbonate (such as ethylene carbonate, propylene carbonate, and butylene carbonate), methanol, ethanol, water, dimethylsulfoxide ("DMSO"), N-methyl-2-pyrrolidone ("NMP"), N,N-dimethylformamide ("DMF"), and N,N-dimethyl acetamide ("DMA"). A combination comprising at least one of the foregoing solvents can be used. Any suitable solvent available for these purposes in the art may be used.

The method may include secondarily thermal-treating a reaction product from the primary thermal-treating at a temperature of about 120° C. to about 190° C.

An amount of the compound of Formula 10 may be from about 1 mole to about 1.1 mole based on 1 mole of the compound of Formula 9.

In some embodiments, a compound of Formula 11 below may be further added in the reacting of the compound of Formula 9 and the compound of Formula 10. In this regards, an amount of the compound of Formula 11 may vary depending on a mole fraction of the second repeating unit of Formula 2.

Y-A-Y     Formula 11

In Formula 11,

A may be a substituted or unsubstituted C6-C40 arylene group, a substituted or unsubstituted C7-C40 arylalkylene group, a substituted or unsubstituted C6-C40 arylene oxy group, a substituted or unsubstituted C7-C40 arylalkylene oxy group, a substituted or unsubstituted C2-C40 heteroarylene group, a substituted or unsubstituted C3-C40 heteroarylalkylene group, a substituted or unsubstituted C2-C40 heteroarylene oxy group, a substituted or unsubstituted C2-C40 heteroarylalkylene oxy group, a substituted or unsubstituted C4-C40 carbocyclic group, a substituted or unsubstituted C5-C40 carbocyclic alkylene group, a substituted or unsubstituted C4-C40 carbocyclic oxy group, or a substituted or unsubstituted C4-C40 carbocyclic alkylene oxy group; and Y may be a halogen atom.

As described above, when the compound of Formula 11 is added, a polymer including a first repeating unit of Formula 1 and a second repeating unit of Formula 2 may be obtained. In this case, the polymer represented by Formula 2 may be prepared by reacting a compound of Formula 10, wherein Ar1 is Ar2, with a compound of Formula 11.

Non-limiting examples of the compound of Formula 9 are bis(4-fluoro-3-sulfophenyl)(3-sulfophenyl)phosphine oxide, and (bis(4-chloro-3-sulfophenyl)(3-sulfophenyl)phosphine oxide.

Non-limiting examples of the compound of Formula 10 are 4,4'-dihydroxybiphenyl(p,p'-biphenol), or a compound represented by Formula 10a below:

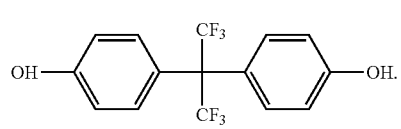

Formula 10a

Non-limiting examples of the compound of Formula 11 are bis(4-fluorophenyl)(phenyl)phosphine oxide, a compound represented by Formula 11a below, or a compound represented by Formula 12 below:

Formula 11a

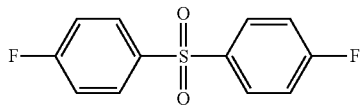

Formula 11b

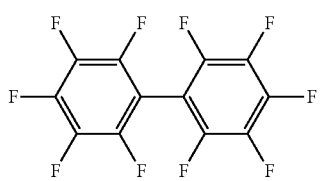

Formula 12

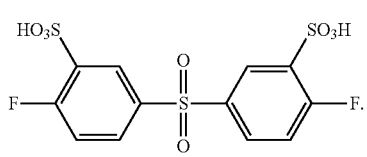

The polymer obtained using the above-described method may be a block copolymer, an alternating copolymer, or a random copolymer depending on the linking status of the first repeating unit and the second repeating unit.

According to another embodiment, a composite membrane includes any of the polymers according to the above-described embodiments.

The composite membrane including the above-described polymer may have improved thermal stability, improved tensile strength, improved strain at break, and improved conductivity characteristics.

The composite membrane may further include at least one compound selected from compounds of Formulae 14 to 19. When the composite membrane further includes at least one of the compounds of Formulae 14 to 19, the at least one of the compounds of Formulae 14 to 19 or a polymer thereof may be involved in the polymerization of the polymer of Formula 1 to form a polymerization product of the polymer of Formula 1 and the at least one of the compounds of Formulae 14 to 19 or a polymer thereof. For example, at least one polymer selected from compounds of Formulae 14 to 19 may be involved in the polymerization of the polymer of Formula 1 to form a polymerization product of the polymer of Formula 1 and the at least one polymer selected from compounds of Formulae 14 to 19.

As used herein, the terms "a polymerization product of a composition comprising the polymer including a first repeating unit represented by Formula 1 and at least one selected from compounds of Formulae 14 to 19" may indicate a cross-linked product of the polymer including the first repeating unit of Formula 1 and the at least one selected from compounds of Formulae 14 to 19.

Formula 14

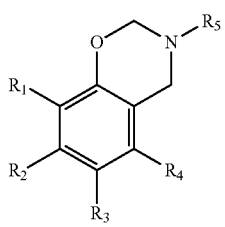

In Formula 14, $R_1$, $R_2$, $R_3$, and $R_4$ may be each independently a hydrogen atom, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C2-C20 heteroaryl group, a substituted or unsubstituted C2-C20 heteroaryloxy group, a substituted or unsubstituted C4-C20 carbocyclic group, a substituted or unsubstituted C4-C20 carbocyclic oxy group, a substituted or unsubstituted C2-C20 heterocyclic group, a halogen atom, a hydroxy group, or a cyano group; and $R_5$ may be a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, or a substituted or unsubstituted C2-C20 heterocyclic alkyl group.

Formula 15

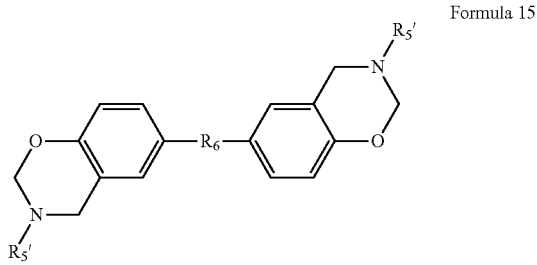

In Formula 15, $R_5'$ may be a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, or a substituted or unsubstituted C2-C20 heterocyclic alkyl group; and $R_6$ may be selected from a substituted or unsubstituted C1-C20 alkylene group, a substituted or unsubstituted C2-C20 alkenylene group, a substituted or unsubstituted C2-C20 alkynylene group, a substituted or unsubstituted C6-C20 arylene group, a substituted or unsubstituted C2-C20 heteroarylene group, —C(=O)—, and —SO$_2$—.

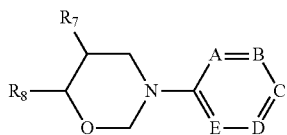

Formula 16

In Formula 16,

A, B, C, D, and E may be carbon atoms; or one or two of A, B, C, D, and E may be nitrogen atoms (N), and the remaining A, B, C, D, and E may be carbon atoms, $R_7$ and $R_8$ may be linked to each other to form a ring, wherein the ring is a C6-C10 cycloalkyl group, a C3-C10 heteroaryl group, a fused C3-C10 heteroaryl group, a C3-C10 heterocyclic group, or a fused C3-C10 heterocyclic group.

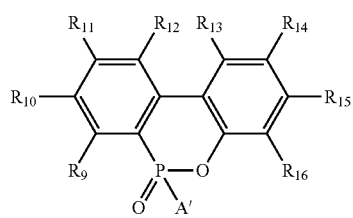

Formula 17

In Formula 17,

A' may be a substituted or unsubstituted C1-C20 heterocyclic group, a substituted or unsubstituted C4-C20 cycloalkyl group, or a substituted or unsubstituted C1-C20 alkyl group; and $R_9$ to $R_{16}$ may be each independently a hydrogen atom, C1-C20 alkyl group, a C1-C20 alkoxy group, a C6-C20 aryl group, a C6-C20 aryloxy group, a C1-C20 heteroaryl group, a C1-C20 heteroaryloxy group, a C4-C20 cycloalkyl group, a C1-C20 heterocyclic group, a halogen atom, a cyano group, or a hydroxy group.

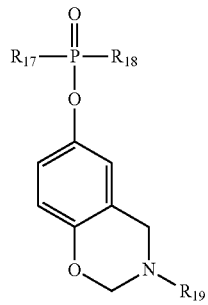

Formula 18

In Formula 18, $R_{17}$ and $R_{18}$ may be each independently a C1-C20 alkyl group, a C1-C20 alkoxy group, a C6-C20 aryl group, a C6-C20 aryloxy group, or a group represented by Formula 8A below.

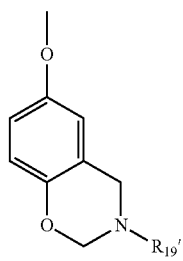

Formula 18a

In Formulae 18 and 18a, $R_{19}$ and $R_{19'}$ may be each independently a hydrogen atom, a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 cycloalkyl group, a halogenated C4-C20 cycloalkyl group, a C1-C20 heterocyclic group, or a halogenated C1-C20 heterocyclic group.

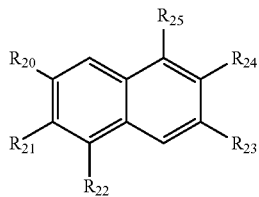

Formula 19

In Formula 19, at least two groups selected from $R_{20}$, $R_{21}$, and $R_{22}$ may be linked to each other to form a group represented by Formula 19a below, the remaining $R_{20}$, $R_{21}$, and $R_{22}$ may be each independently a hydrogen atom, a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 carbocyclic group, a halogenated C4-C20 carbocyclic group, a C1-C20 heterocyclic group, or a halogenated C1-C20 heterocyclic group, at least two adjacent groups selected from $R_{23}$, $R_{24}$, and $R_{25}$ may be linked to each other to form a group represented by Formula 19a below, and the remaining $R_{23}$, $R_{24}$, and $R_{25}$ may be each independently a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 carbocyclic group, a halogenated C4-C20 carbocyclic group, a C1-C20 heterocyclic group, or a halogenated C1-C20 heterocyclic group.

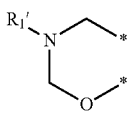

Formula 19a

In Formula 19a, $R_1'$ may be a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, or a substituted or unsubstituted C2-C20 heterocyclic alkyl group, and

* indicates a binding site to at least two adjacent groups of $R_{20}$, $R_{21}$, and $R_{22}$ in Formula 19, and a binding site to at least two adjacent groups of $R_{23}$, $R_{24}$, and $R_{25}$ in Formula 19.

A composition for forming the composite membrane may include the polymer including a first repeating unit of Formula 1 and at least one selected from compounds of Formulae 14 to 19.

An amount of the at least one selected from compounds of Formulae 14 to 19 may be from about 5 parts to about 70 parts by weight, and in some embodiments, from about 20 parts to about 50 parts by weight, based on 100 parts by weight of the polymer including the first repeating unit of Formula 1.

When the amount of the at least one of the compounds of Formulae 14 to 19 is within this range, a composite or composite membrane having improved physical characteristics may be obtained from the composition.

The composite may be a polymerization product of either the polymer including a first repeating unit of Formula 1 or a polymer including a first repeating unit of Formula 1 and a second repeating unit of Formula 2, and a polymer of at least one selected from compounds of Formulae 14 to 19. This may be identified from infrared ray absorption spectra or nuclear magnetic resonance spectra of the polymerization product.

A composite membrane formed using the composite may have improved thermal stability, improved conductivity, and improved mechanical characteristics.

The composite membrane may be used as an electrolyte membrane.

According to another embodiment, a method of forming a composite membrane is described below.

The polymer including a first repeating unit of Formula 1 or the polymer including a first repeating unit of Formula 1 and a second repeating unit of Formula 2 may be mixed with a solvent to obtain a composition for forming the composite membrane, which may then be coated on a substrate and thermally treated to obtain the composite membrane.

At least one selected from compounds of Formulae 14 to 19 may be added into the composition for forming the composite membrane.

The coating of the composition is not specifically limited, and may be performed using dipping, spray coating, screen printing, coating with a doctor blade, Gravure coating, dip coating, roll coating, comma coating, silk screen, or a combination thereof.

In an embodiment, the coating of the composition may be performed by applying the composition to a substrate, leaving the substrate at a predetermined temperature to allow the composition to uniformly spread over the substrate, and shaping the composition in membrane form having a predetermined thickness by using a coater, such as a doctor blade.

The mixing of the polymer and at least one of the compounds of Formulae 14 to 19 is not specifically limited for example, in terms of the order of adding the compounds, use of a solvent, and a type of the solvent.

During the mixing, a ball mill, for example, a planetary ball mill, may be used to mix the components while grinding. The method of mixing is not particularly critical and may be carried out by a variety of means, for example dispersion, blending, stirring, sonication, sparging, milling, shaking, centrifugal circulating pump mixing, blade mixing, impact mixing, jet mixing, homogenization, co-spraying, high sheer mixing, single pass and multi-pass mixing, and the like.

The thermal treatment may be performed at a temperature of from room temperature (from about 20° C. to about 25° C.) to about 300° C., and in some embodiments, may be performed at about 150° C. When the thermal treatment is performed within these temperature ranges, an electrolyte membrane with improved conductivity and uniform thickness may be attained without a reduction in mechanical strength.

The solvent may be dichloromethane, chloroform, toluene, chlorobenzene, methyl acetate, ethyl acetate, γ-butyrolactone, acetone, methyl ethyl ketone, cyclohexanone, ether, 1,2-dimethoxyethane ("DME"), 1,2-diethoxyethane, tetrahydrofuran ("THF"), 1,4-dioxane, a chain-type carbonate (such as dimethyl carbonate, ethyl methyl carbonate, diethyl carbonate, and dipropyl carbonate), a cyclic carbonate (such as ethylene carbonate, propylene carbonate, and butylene carbonate), methanol, ethanol, water, dimethylsulfoxide ("DMSO"), N-methylpyrrolidone ("NMP"), N,N-dimethylacetamide ("DMA"), N,N-dimethylformamide ("DMF"), or the like. A combination comprising at least one of the foregoing solvents can be used. Any suitable solvent available for these purposes in the art may be used.

An amount of the solvent may be from about 100 parts to about 2,000 parts by weight, and in some embodiments, about 500 to 1,000 parts by weight based on 100 parts by weight of the polymer. When the amount of the solvent is within these ranges, the composition may have an appropriate solid content with an appropriate viscosity, which may improve the feasibility of the process of forming the composite membrane from the composition.

In an embodiment, the composition may be coated on a substrate and thermally treated to form a film, which may then be separated from the substrate, thereby obtaining a composite membrane.

The substrate is not specifically limited. For example, the substrate may be any of a variety of supports, such as a glass substrate, a release film, or an anode electrode.

Non-limiting examples of the release film are a polytetrafluoroethylene film, a polyvinylidenefluoride film, a polyethyleneterephthalate film, and a mylar film.

When used as an electrolyte membrane, the composite membrane may supply a phosphoric acid-based material to the electrolyte membrane. When the phosphoric acid-based material is supplied to the electrolyte membrane, a reaction temperature may be from about 30° C. to about 120° C., and in another embodiment, may be at about 60° C.

The phosphoric acid-based material may be supplied to the electrolyte membrane in any of a variety of manners. For example, the electrolyte membrane may be immersed in the phosphoric acid-based material.

The electrolyte membrane prepared through the above-described processes may have a thickness of about 1 μm to about 100 μm, and in some embodiments, may have a thickness of about 30 μm to about 90 μm. The composite membrane may be formed as a thin film having a thickness as defined above.

The electrolyte membrane may be used as a non-humidified proton conductor, and may be used in a fuel cell operating in low-temperature, high-humidity conditions, or in high-temperature, non-humidified conditions. The term "high temperature" indicates a temperature of about 120° C. to about 400° C.; however, the high temperature is not particularly limited.

According to an aspect, there is provided a fuel cell that includes the above-described composite membrane as an electrolyte membrane disposed between a cathode and an anode. The fuel cell may have high efficiency characteristics because it exhibits high proton conductivity and lifetime characteristics at high temperatures in non-humidified conditions.

The fuel cell may be used for any purpose. For example, the fuel cell may be used to implement a solid oxide fuel cell ("SOFC"), a proton exchange membrane fuel cell ("PEMFCs"), and the like.

Figure 2:
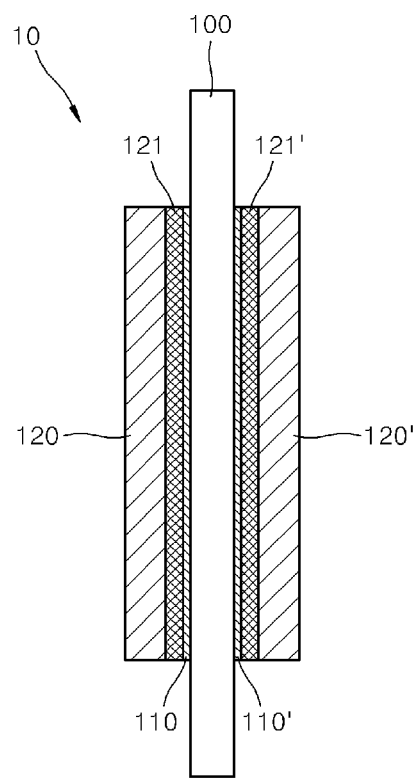
FIG. 2 is a cross-sectional diagram of a membrane-electrode assembly ("MEA") of the fuel cell of FIG. 1.

FIG. 1 is a perspective exploded view of a fuel cell 1 according to an embodiment. FIG. 2 is a cross-sectional diagram of a membrane-electrode assembly ("MEA") that forms the fuel cell 1 of FIG. 1.

Referring to FIG. 1, the fuel cell 1 according to the present embodiment includes two unit cells 11 that are supported by a pair of holders 12. Each unit cell 11 includes an MEA 10, and bipolar plates 20 disposed on lateral sides of the MEA 10. Each bipolar plate 20 includes a conductive metal, carbon or the like, and operates as a current collector, while providing oxygen and fuel to the catalyst layers of the corresponding MEA 10.

Although only two unit cells 11 are shown illustrated in FIG. 1, the number of unit cells 11 is not limited to two and the fuel cell 1 may have several tens or hundreds of unit cells 11, depending on the required properties of the fuel cell 1.

As shown in FIG. 2, the MEA 10 includes an electrolyte membrane 100, catalyst layers 110 and 110' disposed on lateral sides of the electrolyte membrane 100, and first gas diffusion layers 121 and 121' respectively stacked on the catalyst layers 110 and 110', and second gas diffusion layers 120 and 120' respectively stacked on the first gas diffusion layers 121 and 121'.

The electrolyte membrane 100 may be a composite electrode according to the embodiments.

The catalyst layers 110 and 110' respectively operate as a fuel electrode and an oxygen electrode, each including a catalyst and a binder therein. The catalyst layers 110 and 110' may further include a material that may increase the electrochemical surface area of the catalyst.

The first gas diffusion layers 121 and 121' and the second gas diffusion layers 120 and 120' may each be formed of a material such as, for example, carbon sheet or carbon paper. The first gas diffusion layers 121 and 121' and the second gas diffusion layers 120 diffuse oxygen and fuel supplied through the bipolar plates 20 into the entire surfaces of the catalyst layers 110 and 110'.

The fuel cell 1 including the MEA 10 operates at a temperature of, for example, about 1,250° C. to about 3,000° C. Fuel such as hydrogen is supplied through one of the bipolar plates 20 into a first catalyst layer, and an oxidant such as oxygen is supplied through the other bipolar plate 20 into a second catalyst layer. Then, hydrogen is oxidized into protons in the first catalyst layer, and the protons migrate to the second catalyst layer through the electrolyte membrane 4. Then, the protons electrochemically react with oxygen in the second catalyst layer to produce water and electrical energy. Hydrogen produced from reformation of hydrocarbons or alcohols may be supplied as the fuel. Oxygen as the oxidant may be supplied in the form of air.

Hereinafter, a method of manufacturing a fuel cell using the electrolyte membrane according to an embodiment will be described.

Electrodes for a fuel cell that each includes a catalyst layer containing a catalyst and a binder may be used.

The catalyst may be platinum (Pt), an alloy or a mixture of platinum (Pt) and at least one metal selected from gold (Au), palladium (Pd), rhodium (Ru), iridium (Ir), ruthenium (Ru), tin (Sn), molybdenum (Mo), cobalt (Co), and chromium (Cr). The Pt, the alloy, or the mixture may be supported on a carbonaceous support. For example, the catalyst may be at least one metal selected from Pt, a PtCo alloy, and a PtRu alloy. These metals may be supported on a carbonaceous support.

The binder may be at least one of a vinylidene fluoride/hexafluoropropylene copolymer, poly(vinylidenefluoride) ("PVDF"), polyacrylonitrile, polymethylmethacrylate, polytetrafluoroethylene, polyvinyl chloride, polyvinyl pyrrolidone, polypropylene, polyvinyl alcohol, carboxymethyl cellulose, hydroxypropyl cellulose, diacetyl cellulose, a styrene butadiene rubber polymer, a tetrafluoroethylene-hexafluoroethylene copolymer, and perfluoroethylene. A combination including at least one of the foregoing binders can be used. Any suitable binder available for these purposes in the art may be used. The amount of the binder may be in the range of about 0.001 to about 0.5 parts by weight, and in some embodiments about 0.01 to about 0.5 parts by weight based on 1 part by weight of the catalyst. When the amount of the binder is within this range, the electrode catalyst layer may have strong binding ability to the support.

Any of the electrolyte membranes according to the embodiments including the composite may be disposed between the two electrodes to manufacture the fuel cell.

In some embodiments, the composite prepared from a composition including a polymer having a first repeating unit of Formula 1 may be used to form an electrode for a fuel cell.

The composition may further include at least one selected from compounds represented by Formulae 14 to 19 above.

An amount of the at least one compound selected from compounds of Formulae 14 to 19 may be from about 5 parts to about 70 parts by weight, in some embodiments about 10 to about 70 parts by weight, and in other embodiments about 10 to about 50 parts by weight based on 100 parts by weight of the polymer including the first repeating unit of Formula 1.

According to an embodiment, a method of forming an electrode for a fuel cell may involve dispersing a catalyst in a third solvent to obtain a dispersion.

The third solvent may be dimethylsulfoxide ("DMSO"), N-methylpyrrolidone ("NMP"), N,N-dimethylformamide ("DMF"), N, N-dimethylacetamide ("DMA"), dichloromethane, chloroform, toluene, chlorobenzene, methyl acetate, ethyl acetate, γ-butyrolactone, acetone, methyl ethyl ketone, cyclohexanone, ether, 1,2-dimethoxyethane ("DME"), 1,2-diethoxyethane, tetrahydrofuran ("THF"), 1,4-dioxane, a chain-type carbonate (such as dimethyl carbonate, ethyl methyl carbonate, diethyl carbonate, and dipropyl carbonate), a cyclic carbonate (such as ethylene carbonate, propylene carbonate, and butylene carbonate), methanol, ethanol, and water, or the like. A combination comprising at least one of the foregoing solvents can be used. Any suitable material available for these purposes in the art may be used. An amount of the third solvent may be from about 100 parts to about 2,000 parts, and in some embodiments about 500 to about 1,000 parts by weight based on 100 parts by weight of the catalyst.

The polymer including the first repeating unit of Formula 1, or a mixture of the polymer including the first repeating unit of Formula 1 and at least one selected from compounds of Formulae 14 to 19 may be added to the dispersion, and then mixed together while stirring to obtain a composition for forming an electrode catalyst layer. A binder may be further added to the composition.

The composition for an electrode catalyst layer may be coated on the surface of a carbon support, thereby completing formation of the electrode. Herein, the carbon support may be fixed on a glass substrate to facilitate the coating. The coating method is not particularly limited, but examples of the coating method may be coating using a doctor blade, bar coating, and screen printing.

The coating of the composition for forming the electrode catalyst layer may be followed by thermal treatment, which may be performed at a temperature of from about 20° C. to about 150° C.

The electrode for fuel cells as a final product may include a composite as a polymerization product of the polymer including a first repeating unit of Formula 1. Alternatively, the electrode for fuel cells as a final product may include a composite as a polymerization product of the polymer including a first repeating unit of Formula 1 and at least one of the compounds of Formulae 14 to 19.

The polymerization product may be obtained through the above-described thermal treatment or during operation of a battery including the above-described electrode as a result of the polymerization of the polymer including the first repeating unit of Formula 1 and at least one selected from compounds of Formulae 14 to 19.

For example, the polymerization reaction may include a cross-linking reaction between the polymer including a first repeating unit of Formula 1 and at least one selected from compounds of Formulae 14 to 19. Alternatively, the polymerization reaction may include may include a cross-linking reaction between the polymer including a first repeating unit of Formula 1 and a polymer of at least one selected from compounds of Formulae 14 to 19.

Substituents in the formulae above may be defined as follows.

As used herein, the term "alkyl" indicates a completely saturated, branched or unbranched (or a straight or linear) hydrocarbon having the specified number of carbon atoms.

Non-limiting examples of the "alkyl" group include methyl, ethyl, n-propyl, isopropyl, n-butyl, isobutyl, sec-butyl, t-butyl, isopentyl, neopentyl, iso-amyl, n-hexyl, 3-methylhexyl, 2,2-dimethylpentyl, 2,3-dimethylpentyl, and n-heptyl.

At least one hydrogen atom of the alkyl group may be substituted with a halogen atom, a C1-C20 alkyl group substituted with a halogen atom (for example, $-CCF_3$, $-CHCF_2$, $-CH_2F$, $-CCl_3$, and the like), a C1-C20 alkoxy group, a C2-C20 alkoxyalkyl group, a hydroxyl group ($-OH$), a nitro group ($-NO_2$), a cyano group ($-CN$), an amino group ($-NRR'$, wherein R and R' are each independently hydrogen or a C1-C10 alkyl group), an amido group ($-C(=O)NRR'$, wherein R and R' are independently hydrogen or a C1-C10 alkyl group), an amidino group ($-C(=NH)NRR'$ wherein R and R' are independently hydrogen or a C1-C10 alkyl group), a hydrazine group ($-NHNRR'$, wherein R and R' are independently hydrogen or a $C_1$-$C_{10}$ alkyl group), a hydrazone group ($-CR=NHNR'R''$, wherein R, R' and R'' are independently hydrogen or a C1-C10 alkyl group), a carboxyl group ($-CO_2H$) or a salt thereof, a sulfonyl group, a sulfamoyl group, a sulfonic acid group ($-SO_3H$) or a salt thereof, a phosphoric acid ($-P(=O)(OH)_2$) or a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, a C7-C20 heteroarylalkyl group, a C6-C20 heteroaryloxy group, a C6-C20 heteroaryloxyalkyl group, or a C6-C20 heteroarylalkyl group.

The term "halogen atom" indicates fluorine, bromine, chloride, iodine, and the like.

The term "C1-C20 alkyl group substituted with a halogen atom" indicates a C1-C20 alkyl group substituted with at least one halogen atom. Non-limiting examples of the C1-C20 alkyl group substituted with a halogen atom include polyhaloalkyls including monohaloalkyl, dihaloalkyl, or perhaloalkyl.

Monohaloalkyls indicate alkyl groups including one iodine, bromine, chloride or fluoride. Dihaloalkyls indicate alkyl groups including two identical or different halogen atoms. Perhaloalkyls indicate alkyl groups wherein all hydrogen atoms are replaced with identical or different halogen atoms.

As used herein, the term "alkoxy" represents "alkyl-O-", wherein the alkyl is the same as described above, and which has the specified number of carbon atoms. Non-limiting examples of the alkoxy group include methoxy, ethoxy, n-propoxy, 2-propoxy, n-butoxy, iso-butoxy, t-butoxy, pentyloxy, hexyloxy, cyclopropoxy, and cyclohexyloxy. At least one hydrogen atom of the alkoxy group may be substituted with substituents that are the same as those recited above in conjunction with the alkyl group.

As used herein, the term "alkoxyalkyl" indicates an alkyl group with an alkoxy substituent as recited above, and which has the specified number of carbon atoms. At least one hydrogen atom of the alkoxyalkyl group may be substituted with substituents that are the same as those recited above in conjunction with the alkyl group. As defined above, the term "alkoxyalkyl" indicates unsubstituted or substituted alkoxyalkyl moieties.

As used herein, the term "alkenyl" indicates a branched or unbranched hydrocarbon with at least one carbon-carbon double bond having the specified number of carbon atoms. Non-limiting examples of the alkenyl group include vinyl, aryl, butenyl, isopropenyl, and isobutenyl. At least one hydrogen atom in the alkenyl group may be substituted with a substituent that is the same as that recited above in conjunction with the alkyl group.

As used herein, the term "alkynyl" indicates a branched or unbranched hydrocarbon with at least one carbon-carbon triple bond having the specified number of carbon atoms. Non-limiting examples of the "alkynyl" group include ethynyl, butynyl, isobutynyl, and isopropynyl.

At least one hydrogen atom of the "alkynyl" group may be substituted with substituents that are the same as those recited above in conjunction with the alkyl group.

As used herein, the term "aryl", which is used alone or in combination, indicates an aromatic hydrocarbon containing at least one ring and having the specified number of carbon atoms.

The term "aryl" may be construed as including a group with an aromatic ring fused to at least one cycloalkyl ring.

Non-limiting examples of the "aryl" group include phenyl, naphthyl, and tetrahydronaphthyl.

At least one hydrogen atom of the "aryl" group may be substituted with substituents that are the same as those recited above in conjunction with the alkyl group.

As used herein, the term "arylalkyl" indicates an alkyl group substituted with an aryl group. Non-limiting examples of the arylalkyl group include benzyl ($C_6H_5CH_2$—) or phenylethyl ($C_6H_5CH_2CH_2$—).

As used herein, the term "aryloxy" indicates "—O-aryl", wherein the aryl is the same as described above, and which has the specified number of carbon atoms. An example of the aryloxy group is phenoxy. At least one hydrogen atom of the "aryloxy" group may be substituted with substituents that are the same as those recited above in conjunction with the alkyl group. An example of the aryloxy group is phenoxy.

As used herein, the term "heteroaryl" indicates a monocyclic or bicyclic organic compound including at least one heteroatom selected from nitrogen (N), oxygen (O), phosphorous (P), and sulfur (S), wherein the remaining ring atoms are all carbon. The heteroaryl group may include, for example, one to five heteroatoms, and in some embodiments, may include a five- to ten-membered ring.

In the heteroaryl group, S or N may be present in various oxidized forms.

Non-limiting examples of the monocyclic heteroaryl group include thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiaxolyl, 1,2,3-thiadiazolyl, 1,2,4-thiadiazolyl, 1,2,5-thiadiazolyl, 1,3,4-thiazolyl, isothiazol-3-yl, isothiazol-4-yl, isothiazol-5-yl, oxazol-2-yl, oxazol-4-yl, oxazol-5-yl, isoxazol-3-yl, isoxazol-4-yl, isoxazol-5-yl, 1,2,4-triazol-3-yl, 1,2,4-triazol-5-yl, 1,2,3-triazol-4-yl, 1,2,3-triazol-5-yl, tetrazolyl, pyrid-2-yl, pyrid-3-yl, 2-pyrazin-2-yl, pyrazin-4-yl, pyrazin-5-yl, 2-pyrimidin-2-yl, 4-pyrimidin-2-yl, and 5-pyrimidin-2-yl.

The term "heteroaryl" may indicate a heteroaromatic ring fused to at least one of an aryl group, a cycloaliphatic group, and a heterocyclic group.

Non-limiting examples of the bicyclic heteroaryl group include indolyl, isoindolyl, indazolyl, indolizinyl, purinyl, quinolizinyl, quinolinyl, isoquinolinyl, cinnolinyl, phthalazinyl, naphthyridinyl, quinazolinyl, quinaxalinyl, phenanthridinyl, phenathrolinyl, phenazinyl, phenothiazinyl, phenoxazinyl, benzisoquinolinyl, thieno[2,3-b]furanyl, furo[3,2-b]-pyranyl, 5H-pyrido[2,3-d]-o-oxazinyl, 1H-pyrazolo[4,3-d]oxazolyl, 4H-imidazo[4,5-d]thiazolyl, pyrazino[2,3-d]pyridazinyl, imidazo[2,1-b]thiazolyl, imidazo[1,2-b][1,2,4]triazinyl, 7-benzo[b]thienyl, benzoxazolyl, benzimidazolyl, benzothiazolyl, benzoxapinyl, benzoxazinyl, 1H-pyrrolo[1,2-b][2]benzazapinyl, benzofuryl, benzothiophenyl, benzotriazolyl, pyrrolo[2,3-b]pyridinyl, pyrrolo[3,2-c]pyridinyl, pyrrolo[3,2-b]pyridinyl, imidazo[4,5-b]pyridinyl, imidazo[4,5-c]pyridinyl, pyrazolo[4,3-d]pyridinyl, pyrazolo[4,3-c]pyridinyl, pyrazolo[3,4-c]pyridinyl, pyrazolo[3,4-d]pyridinyl, pyrazolo[3,4-b]pyridinyl, imidazo[1,2-a]pyridinyl, pyrazolo[1,5-a]pyridinyl, pyrrolo[1,2-b]pyridazinyl, imidazo[1,2-c]pyrimidinyl, pyrido[3,2-d]pyrimidinyl, pyrido[4,3-d]pyrimidinyl, pyrido[3,4-d]pyrimidinyl, pyrido[2,3-d]pyrimidinyl, pyrido[2,3-b]pyrazinyl, pyrido[3,4-b]pyrazinyl, pyrimido[5,4-d]pyrimidinyl, pyrazino[2,3-b]pyrazinyl, and pyrimido[4,5-d]pyrimidinyl.

At least one hydrogen atom of the "heteroaryl" group may be substituted with substituents that are the same as those recited above in conjunction with the alkyl group.

As used herein, the term "heteroarylalkyl" indicates an alkyl group substituted with a heteroaryl group, wherein the alkyl and heteroaryl groups are the same as described above, and which has the specified number of carbon atoms. An example of the heteroarylalkyl group is 2-pyridylmethyl.

As used herein, the term "heteroaryloxy" group indicates a "—O-heteroaryl moiety", wherein the heteroaryl is the same as described above, and which has the specified number of carbon atoms. At least one hydrogen atom of the heteroaryloxy group may be substituted with substituents that are the same as those recited above in conjunction with the alkyl group. An example of the heteroaryloxy group may be 2-pyridyloxy.

As used herein, the term "heteroaryloxyalkyl" group indicates an alkyl group substituted with a heteroaryloxy group, wherein the alkyl and heteroaryloxy are the same as described above, and which has the specified number of carbon atoms. At least one hydrogen atom of the heteroaryloxyalkyl group may be substituted with substituents that are the same as those recited above in conjunction with the alkyl group. An example of the heteroaryloxy group is 2-pyridyloxymethyl.

As used herein, the term "carbocyclic" group indicates a saturated or partially unsaturated non-aromatic monocyclic, bicyclic or tricyclic hydrocarbon group having a specified number of carbon atoms.

Non-limiting examples of the monocyclic hydrocarbon group include cyclopentyl, cyclopentenyl, cyclohexyl, and cyclohexenyl.

Non-limiting examples of the bicyclic hydrocarbon group include bornyl, decahydronaphthyl, bicyclo[2.1.1]hexyl, bicyclo[2.2.1]heptyl, bicyclo[2.2.1]heptenyl, and bicyclo[2.2.2]octyl.

An example of the tricyclic hydrocarbon group is adamantyl.

At least one hydrogen atom of the "carbocyclic group" may be substituted with substituents that are the same as those recited above in conjunction with the alkyl group.

As used herein, the term "heterocyclic" indicates a five- to ten-membered ring group including a heteroatom such as N, S, P, or O, and having a specified number of carbon atoms. An example of the heterocyclic group is N-piperidyl. At least one hydrogen atom in the heterocyclic group may be substituted with substituents that are the same as those recited above in conjunction with the alkyl group.

As used herein, the term "heterocyclic oxy" indicates "—O-hetero ring" having a specified number of carbon atoms. At least one hydrogen atom of the heterocyclic oxy group may be substituted with substituents that are the same as those recited above in conjunction with the alkyl group. An example of the heterocyclic oxy group may be 4-piperidinoxy-.

As used herein, the term "sulfonyl" indicates R"—$SO_2$—, wherein R" is a hydrogen atom, alkyl, aryl, heteroaryl, arylalkyl, heteroaryl-alkyl, alkoxy, aryloxy, cycloalkyl, or a heterocyclic group.

As used herein, the term "sulfamoyl" group indicates $H_2NS(O_2)$—, alkyl-$NHS(O_2)$—, (alkyl)$_2NS(O_2)$-aryl-NHS($O_2$)—, alkyl-(aryl)-$NS(O_2)$—, (aryl)$_2NS(O)_2$, heteroaryl-$NHS(O_2)$—, (aryl-alkyl)-$NHS(O_2)$—, or (heteroaryl-alkyl)-$NHS(O_2)$—.

At least one hydrogen atom of the sulfamoyl group may be substituted with substituents that are the same as those described above in conjunction with the alkyl group.

As used herein, the term "amino group" indicates a group with a nitrogen atom covalently bonded to at least one carbon or hetero atom and having a specified number of carbon atoms. The amino group may indicate, for example, —$NH_2$ and substituted moieties, as indicated above.

As used herein, the term "amino group" also indicates an "alkylamino group" with nitrogen bound to at least one additional alkyl group, and "arylamino" and "diarylamino" groups with at least one or two nitrogen atoms bound to a selected aryl group.

As used herein, the terms "arylalkyl", "arylalkyl oxy", "heteroarylalkyl", "heteroarylalkyl oxy", "carbocyclic alkyl", and "carbocyclic alkyloxy" indicate groups derived from an aryl group, an aryloxy group, a heteroaryl group, a heteroaryloxy group, a carbocyclic group, and a carbocyclic oxy group, respectively, and further including an alkyl group. These groups may be substituted with substituents that are the same as those described above in conjunction with the alkyl group.

As used herein, the terms "arylalkylene", "arylene oxy", "arylalkylene oxy", "heteroarylene", "heteroarylalkylene", "heteroarylene oxy", "heteroarylalkylene oxy", "carbocyclic alkylene", and "carbocyclic alkylene oxy" indicate divalent organic groups derived from an arylalkyl group, an aryloxy group, an arylalkyl oxy group, a heteroaryl group, a heteroarylalkyl group, a heteroaryloxy group, a heteroarylalkyl oxy group, a carbocyclic alkyl group, and a carbocyclic alkyloxy group, respectively. These groups may be substituted with substituents that are the same as those described above in conjunction with the alkyl group.

As used herein, the terms "alkylene", "arylene oxy", and "heteroalkylene", indicate divalent groups derived from an alkyl group, an aryl group, and a heteroaryl group, respectively. These groups may be substituted with substituents that are the same as those described above in conjunction with the alkyl, aryl, or heteroaryl groups.

Hereinafter, the present inventive concept will be described in detail with reference to the following examples. However, these examples are for illustrative purposes only and do intend to limit the scope of the present disclosure.

Preparation Example 1

Synthesis of Polymer of Formula 6a 1 mmol (0.62 g) of bis(4-fluoro-3-sulfophenyl)(3-sulfophenyl)phosphine oxide, 9 mmol (2.83 g) of bis(4-fluorophenyl)(phenyl)phosphine oxide, and 10 mmol (1.86 g) of 4,4'-dihydroxybiphenyl(p,p'-biphenol) were added into a 3-necked reaction flask equipped with a mechanical stirrer and a dean stark trap.

20 mmol (2.76 g) of $K_2CO_3$, 20 mL of NMP, 10 mL of toluene were put into the reaction flask, followed by azeotropic distillation at about 150° C. for about 2 hours and removing toluene.

The temperature of the reaction flask was increased to about 180° C. for further reaction for about 20 hours, followed by precipitation two to three times with deionized water and isopropyl alcohol for purification. The resulting purified product was dried in a vacuum oven to obtain a polymer of Formula 6a.

A structure of the polymer was identified by nuclear magnetic resonance ("NMR") analysis.

The polymer had a number average molecular weight of about 80,000 and a weight average molecular weight of about 250,000.

Preparation Example 2

Synthesis of Polymer of Formula 6b

Formula 6b

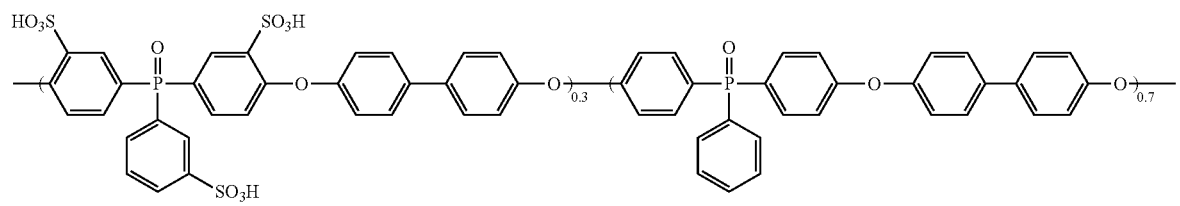

A polymer of Formula 6b was synthesized in the same manner as in Preparation Example 1, except that 3 mmol (1.86 g) of bis(4-fluoro-3-sulfophenyl)(3-sulfophenyl)phosphine oxide and 7 mmol (2.20 g) of bis(4-fluorophenyl)(phenyl)phosphine oxide instead of 1 mmol (0.62 g) of bis(4-fluoro-3-sulfophenyl)(3-sulfophenyl)phosphine oxide and 9 mmol (2.83 g) of bis(4-fluorophenyl)(phenyl)phosphine oxide were used.

A structure of the polymer was identified by NMR analysis.

The polymer had a number average molecular weight of about 65,000 and a weight average molecular weight of about 220,000.

Formula 6a

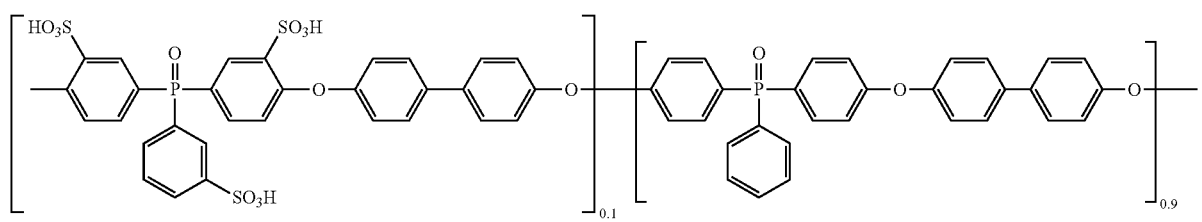

Preparation Example 3

Synthesis of Polymer of Formula 6c

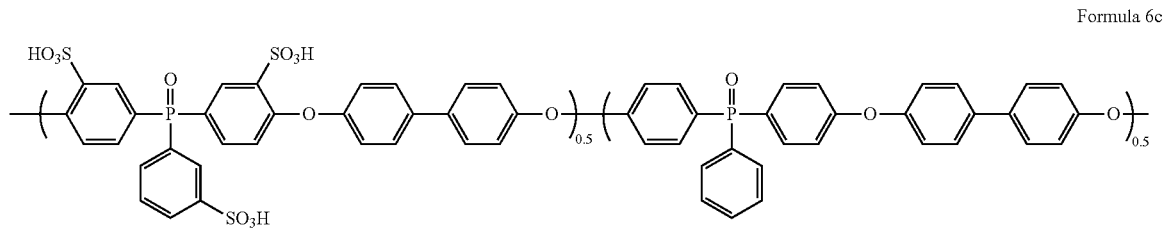

Formula 6c

A polymer of Formula 6 (a=0.5, b=0.5) was synthesized in the same manner as in Preparation Example 1, except that 5 mmol (3.1 g) of bis(4-fluoro-3-sulfophenyl)(3-sulfophenyl)phosphine oxide and 5 mmol (1.57 g) of bis(4-fluorophenyl)(phenyl)phosphine oxide instead of 1 mmol (0.62 g) of bis(4-fluoro-3-sulfophenyl)(3-sulfophenyl)phosphine oxide and 9 mmol (2.83 g) of bis(4-fluorophenyl)(phenyl)phosphine oxide were used.

A structure of the polymer was identified by NMR analysis.

The polymer had a number average molecular weight of about 60,000 and a weight average molecular weight of about 200,000.

Preparation Example 4

Synthesis of Polymer of Formula 7A

A polymer of Formula 7A was synthesized in the same manner as in Preparation Example 1, except that 9 mmol of a compound represented by Formula 11a below instead of 9 mmol of bis(4-fluorophenyl)(phenyl)phosphine oxide was used:

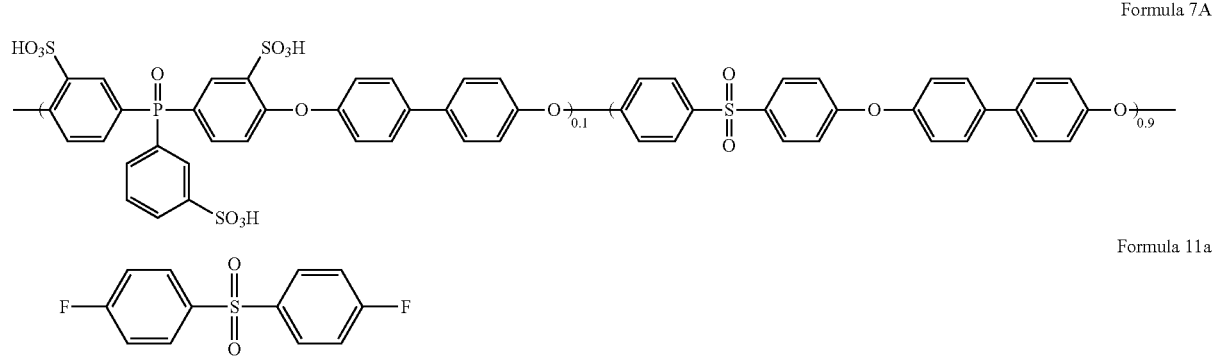

Formula 7A

Formula 11a

A structure of the polymer was identified by NMR analysis.

The polymer had a number average molecular weight of about 100,000 and a weight average molecular weight of about 420,000.

Preparation Example 5

Synthesis of Polymer of Formula 7B

A polymer of Formula 7B was synthesized in the same manner as in Preparation Example 4, except that 7 mmol of the compound represented by Formula 11a and 3 mmol of bis(4-fluoro-3-sulfophenyl)(3-sulfophenyl)phosphine oxide and instead of 9 mmol of the compound represented by Formula 11a and 1 mmol of bis(4-fluoro-3-sulfophenyl)(3-sulfophenyl)phosphine oxide and were used:

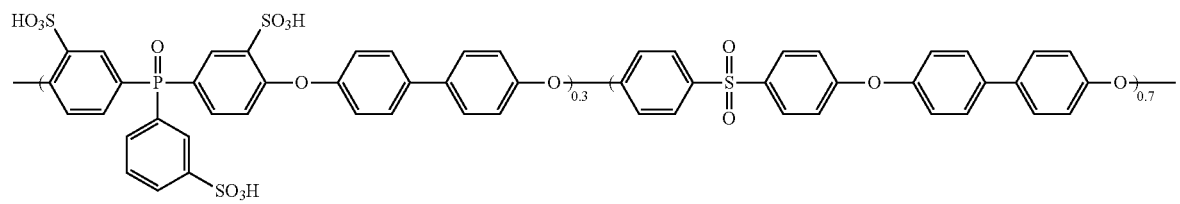

Formula 7B

A structure of the polymer was identified by NMR analysis.

The polymer had a number average molecular weight of about 85,000 and a weight average molecular weight of about 350,000.

Preparation Example 6

Synthesis of Polymer of Formula 7C

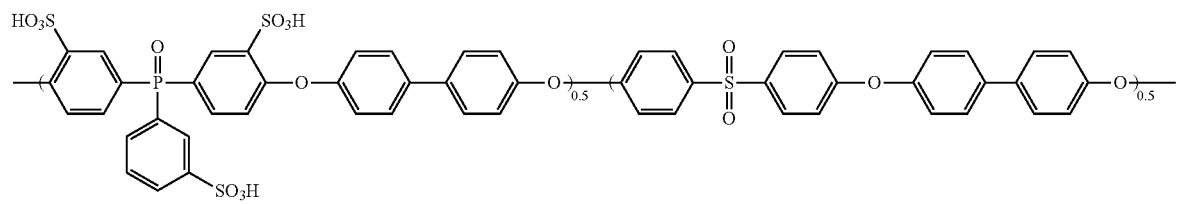

Formula 7C

A polymer of Formula 7C was synthesized in the same manner as in Preparation Example 4, except that 5 mmol of the compound of Formula 11a and 5 mmol of bis(4-fluoro-3-sulfophenyl)(3-sulfophenyl)phosphine oxide instead of 9 mmol of the compound represented by Formula 11a and 1 mmol of bis(4-fluoro-3-sulfophenyl)(3-sulfophenyl)phosphine oxide were used.

A structure of the polymer was identified by NMR analysis.

The polymer had a number average molecular weight of about 60,000 and a weight average molecular weight of about 200,000.

Preparation Example 7

Synthesis of Polymer of Formula 7d

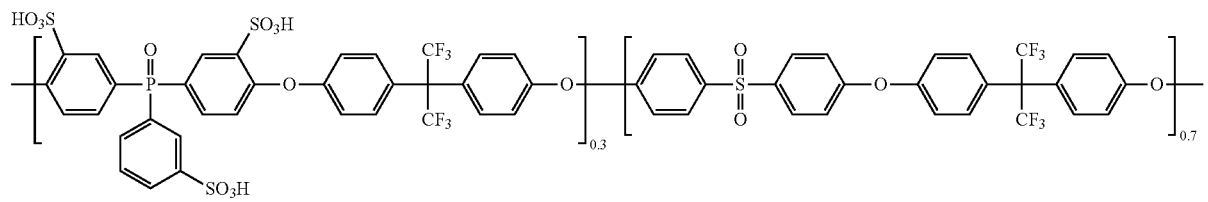

Formula 7d

A polymer of Formula 7d was synthesized in the same manner as in Preparation Example 2, except that 7 mmol of the compound of Formula 11a and 10 mmol of a compound of Formula 10a instead of 3 mmol of bis(4-fluorophenyl)(phenyl)phosphine oxide and 10 mmol of 4,4'-dihydroxybiphenyl were used.

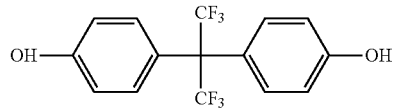

Formula 10a

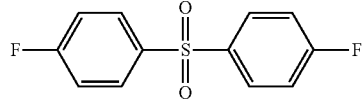

Formula 11a

A structure of the polymer was identified by NMR analysis.

The polymer had a number average molecular weight of about 50,000 and a weight average molecular weight of about 210,000.

Preparation Example 8

Synthesis of Polymer of Formula 7e

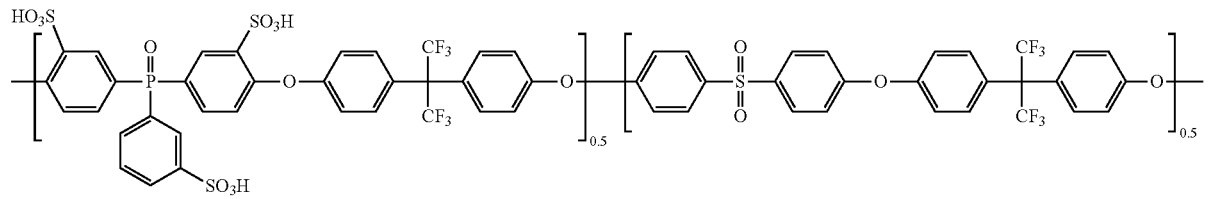

Formula 7e

A polymer of Formula 7e was synthesized in the same manner as in Preparation Example 7, except that 5 mmol of the compound of Formula 11a and 5 mmol of bis(4-fluoro-3-sulfophenyl)(3-sulfophenyl)phosphine oxide instead of 7 mmol of the compound of Formula 11a and 3 mmol of bis(4-fluoro-3-sulfophenyl)(3-sulfophenyl)phosphine oxide were used.

A structure of the polymer was identified by NMR analysis.

The polymer had a number average molecular weight of about 30,000 and a weight average molecular weight of about 160,000.

Preparation Example 9

Synthesis of Polymer of Formula 8a

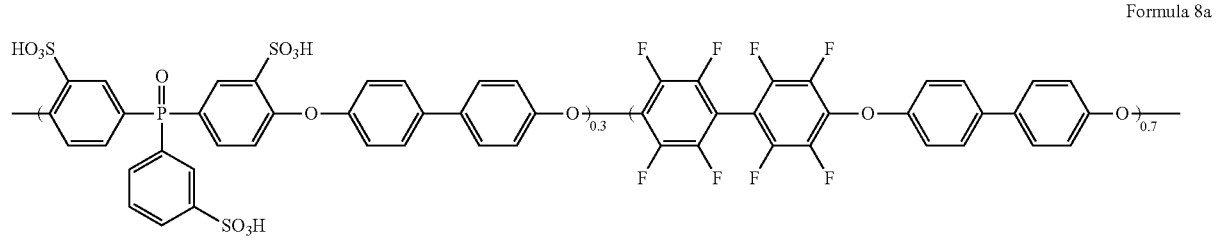

Formula 8a

A polymer of Formula 8a was synthesized in the same manner as in Preparation Example 2, except that 7 mmol of the compound of Formula 11b instead of 7 mmol of bis(4-fluorophenyl)(phenyl)phosphine oxide were used.

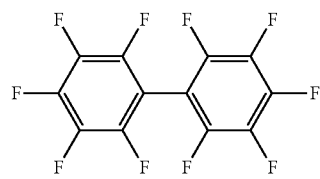

Formula 11b

A structure of the polymer was identified by NMR analysis.

The polymer had a number average molecular weight of about 70,000 and a weight average molecular weight of about 230,000.

Comparative Preparation Example 1

Preparation of Polymer of Formula 13

3 mmol of a compound of Formula 12, 7 mmol of a compound of Formula 11a, and 1.86 g (10 mmol) of 4,4'-dihydroxybiphenyl(p,p'-biphenol) were added into a 3-necked reaction flask equipped with a mechanical stirrer and a dean stark trap.

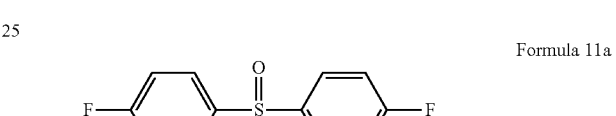

Formula 11a

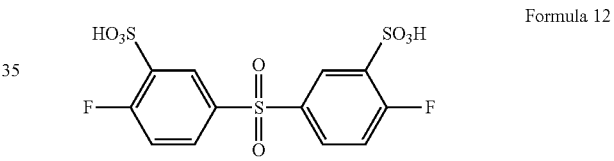

Formula 12

20 mmol (2.76 g) of $K_2CO_3$, 20 mL of NMP, 10 mL of toluene were put into the reaction flask, followed by azeotropic distillation at about 150° C. for about 2 hours and removing toluene.

The temperature of the reaction flask was increased to about 180° C. for further reaction for about 20 hours, followed by precipitation two to three times with deionized water and isopropyl alcohol for purification. The resulting purified product was dried in a vacuum oven to obtain a polymer of Formula 13.

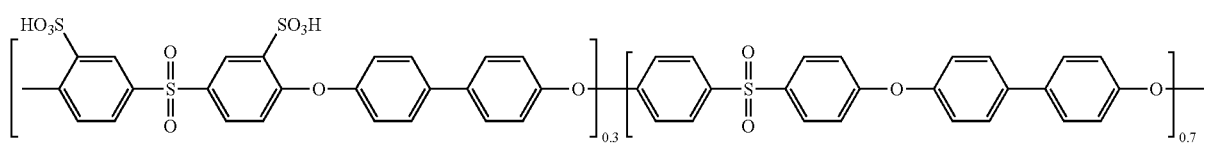

Formula 13

A polymer of Formula 13 having a number average molecular weight of about 140,000 and a weight average molecular weight of about 950,000 was prepared as follows.

Example 1

Preparation of Electrolyte Membrane 2 g of the polymer of Preparation Example 1 was dissolved in 18 ml of N,N-dimethylacetamide ("DMA") to obtain an electrolyte membrane forming composition, which was then cast on to a glass substrate and dried at about 60° C. to form an electrolyte membrane.

Examples 2 to 9

Preparation of Electrolyte Membrane

An electrolyte membrane was formed in the same manner as in Example 1, except that the polymer of Preparation Example 2-9 instead of the polymer of Preparation Example 1 was used.

Comparative Example 1

Preparation of Electrolyte Membrane

An electrolyte membrane was formed in the same manner as in Example 1, except that the polymer of Comparative Preparation Example 1 instead of the polymer of Preparation Example 1 was used.

Manufacture Examples 1-9

Manufacture of Fuel Cell

Fuel cells were manufactured by disposing each of the electrolyte membranes of Examples 1 to 9 between a cathode and anode.

The cathode and anode were manufactured as follows for use in each cell.

4.5 g of a 10 percent by weight (weight %) NAFION (available from Du Pont Inc.) aqueous dispersion was dropwise added to a solution of 50 weight % of PtCo supported on carbon ("PtCo/C") in 3 ml of isopropyl alcohol, followed by mechanical agitation to prepare a composition for forming a cathode catalyst layer.

The composition for forming a cathode catalyst layer was coated on one surface of carbon paper to manufacture the cathode.

The anode was manufactured in the same manner as in the manufacture of the cathode, except that, instead of PtCo/C in the composition for forming a cathode catalyst layer, PtRu/C (50 weight % of PtRu supported on carbon) was used.

To test the performance of each fuel cell, non-humidified $H_2$ and $O_2$ were supplied to the anode and cathode at about 50 cubic centimeters ("ccm") and about 100 ccm, respectively, and the fuel cell was operated at about 100° C. to about 200° C. in non-humidified conditions.

Comparative Manufacture Example 1

Manufacture of Fuel Cell

A fuel cell was manufactured in the same manner as in Manufacture Example 1, except that the electrolyte membrane of Comparative Example 1 instead of the electrolyte membrane of Example 1 was used.

Evaluation Example 1

Nuclear Magnetic Resonance (NMR) Analysis

Proton nuclear magnetic resonance spectra ("$^1$H-NMR") of the polymers of Preparation Examples 1 to 8 are shown in FIGS. 5 to 12.

The structures of the polymers of Preparation Examples 1 to 8 may be identified from the NMR spectra of FIGS. 5 to 12.

Evaluation Example 2

Thermogravimetric Analysis (TGA)

Thermal stabilities of the electrolyte membranes of Examples 4 to 6 and Comparative Example 1 were evaluated using a differential scanning calorimeter (DSC, Q5000IR, available from TA Instruments) as a thermogravimetric analyzer ("TGA") at a heating rate of about 10 degrees Centigrade per minute ("t/min").

Figure 3:
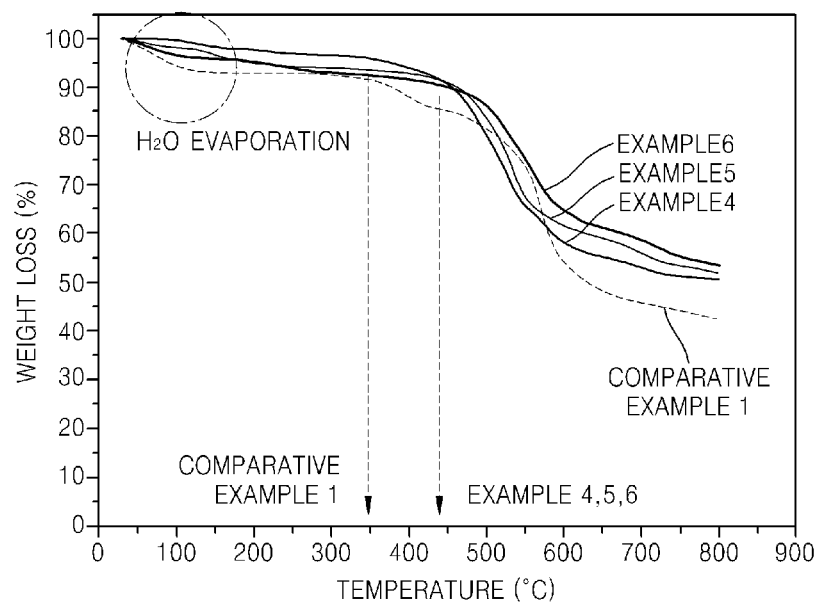
FIG. 3 is a graph of weight loss (percent, %) versus temperature (degree Centigrade, ° C.) illustrating results of thermogravimetric analysis ("TGA") on electrolyte membranes of Examples 4 to 6 and Comparative Example 1.

The evaluation results are shown in FIG. 3.

Referring to FIG. 3, an onset decomposition temperature of the electrolyte membranes of Examples 4 to 6 was higher than that of the electrolyte membrane of Comparative Example 1, and contained a larger amount of actual carbon remaining after heating to about 800° C., which indicates having better thermal stability than the electrolyte membranes of Comparative Example 1.

Evaluation Example 3

Analysis of Mechanical Characteristics of Electrolyte Membrane

Tensile strengths and strains at break of the electrolyte membranes of Examples 1 and 5 and Comparative Example 1 were measured using a universal testing machine (UTM, Lloyd LR-10K). Test samples were prepared based on ASTM standard D638 (Type V specimens).

The results of the tensile strength and strain at break tests are shown in Table 1 below.

Table 1

| Example | Tensile Strength (MPa) | Strain at break (%) |
|---|---|---|
| Example 1 | 81.9 ± 1.2 | 5.9 ± 1.0 |
| Example 5 | 40.4 ± 2.1 | 4.2 ± 0.5 |
| Comparative Example 1 | — | 32.3 ± 10.2 |

Referring to Table 1, the electrolyte membranes of Examples 1 and 5 had a tensile strength of about 20 megapascal ("MPa") or greater, which satisfies stiffness requirements for membrane-electrode assemblies. The electrolyte membranes of Examples 1 and 2 were smaller in stain at break, compared to the electrolyte membranes of Comparative Example 1, indicating that the electrolyte membranes of Examples 1 and 2 are less deformable and more stable to maintain dimensional stability after being assembled into cells. The results of Table 1 indicate that the electrolyte membranes of Examples 1 and 5 have improved mechanical stabilities.

Evaluation Example 4

Conductivity Test

Figure 4:
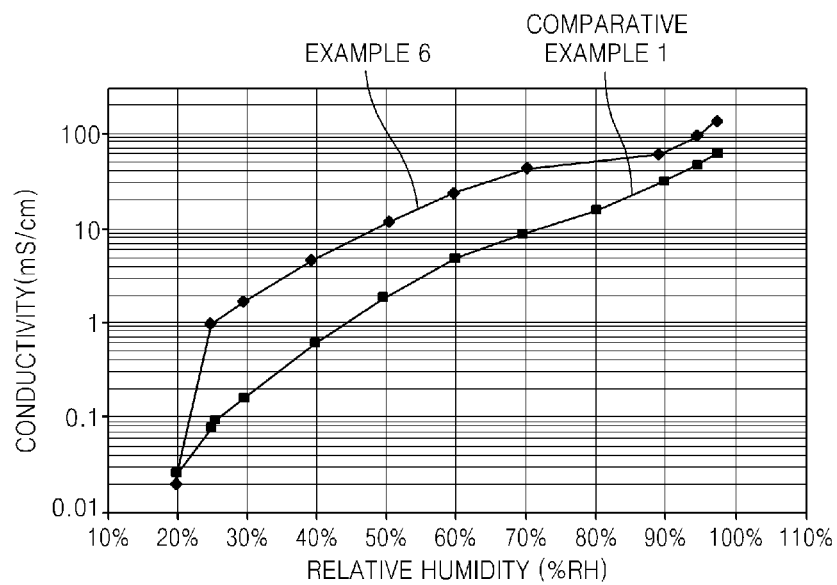
FIG. 4 is a graph of conductivity (millisiemens per centimeter, mS/cm) versus relative humidity (percent of relative humidity, % RH) in the electrolyte membranes of Example 6 and Comparative Example 1.
Figure 5:
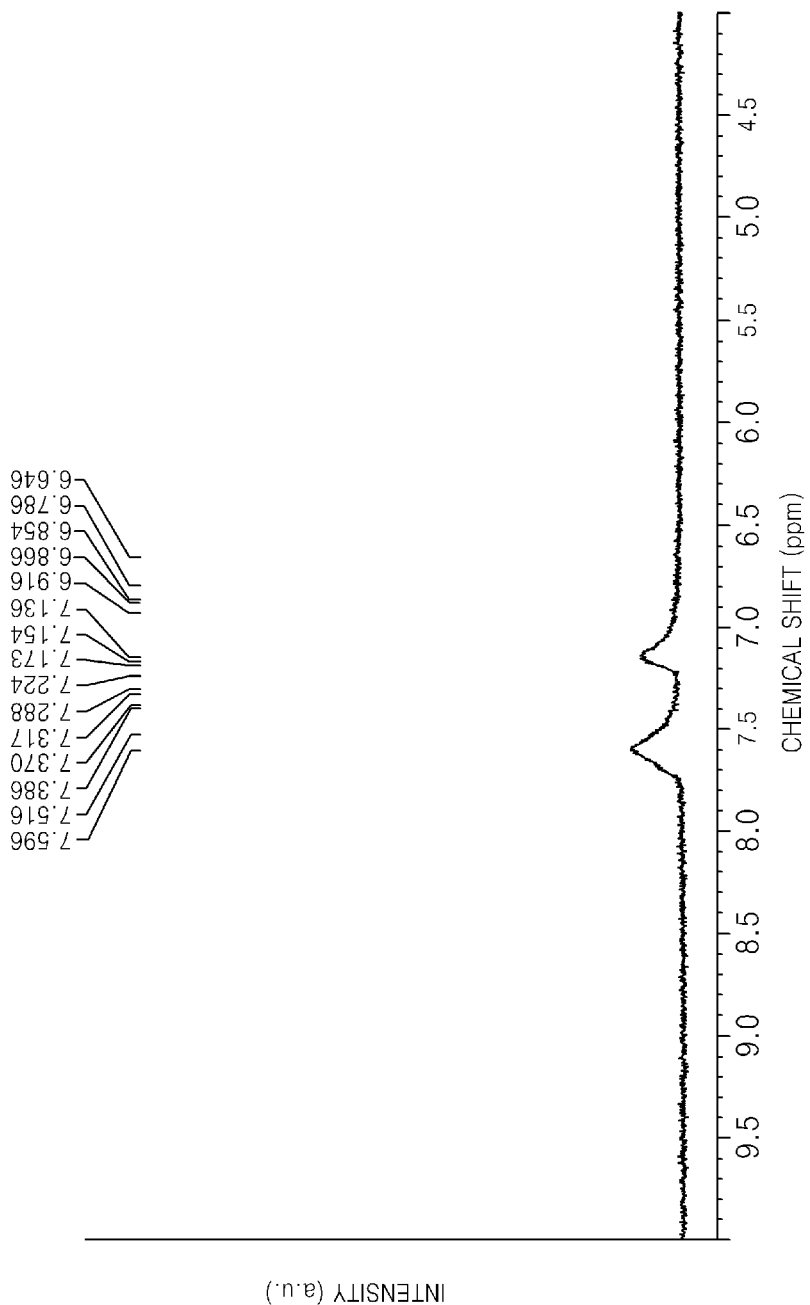
Figure 6:
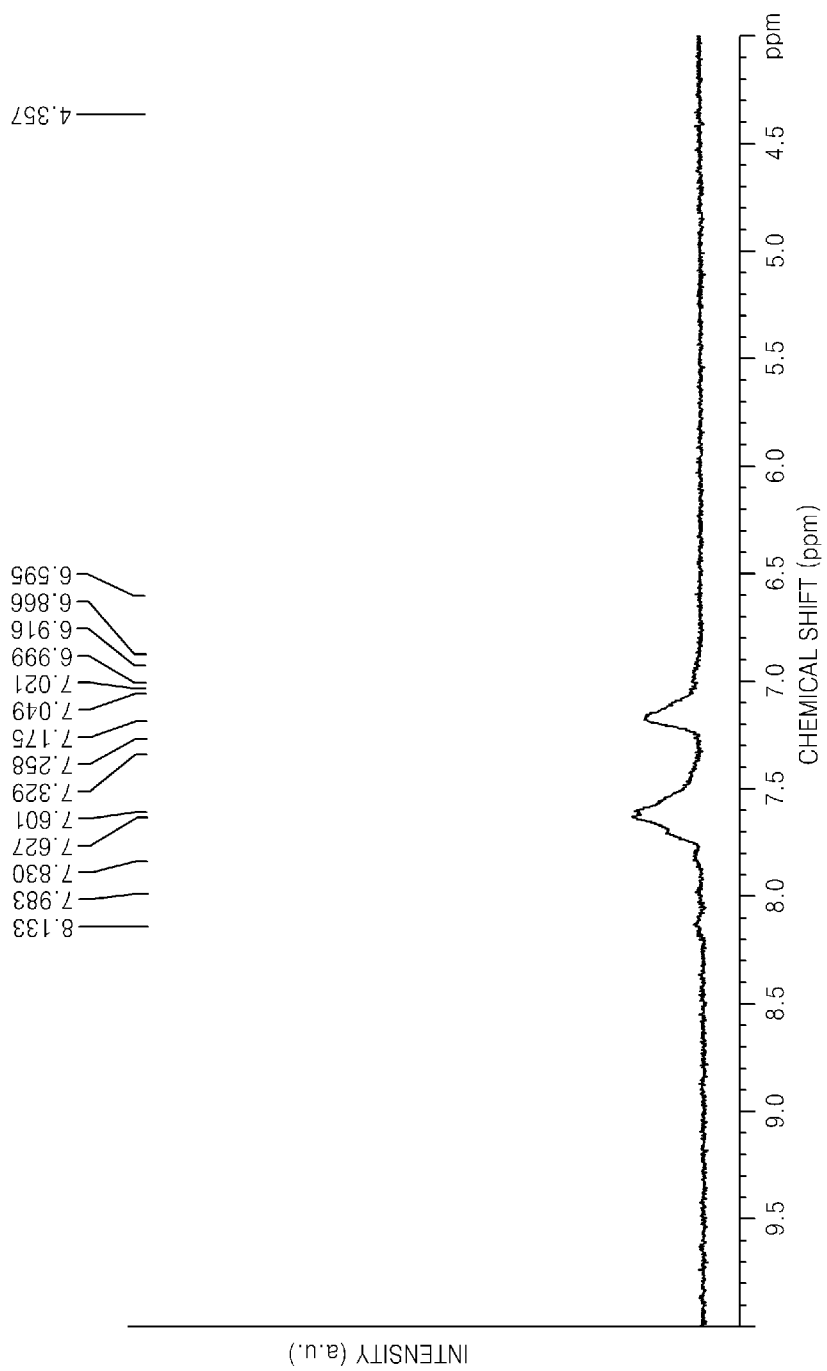
Figure 7:
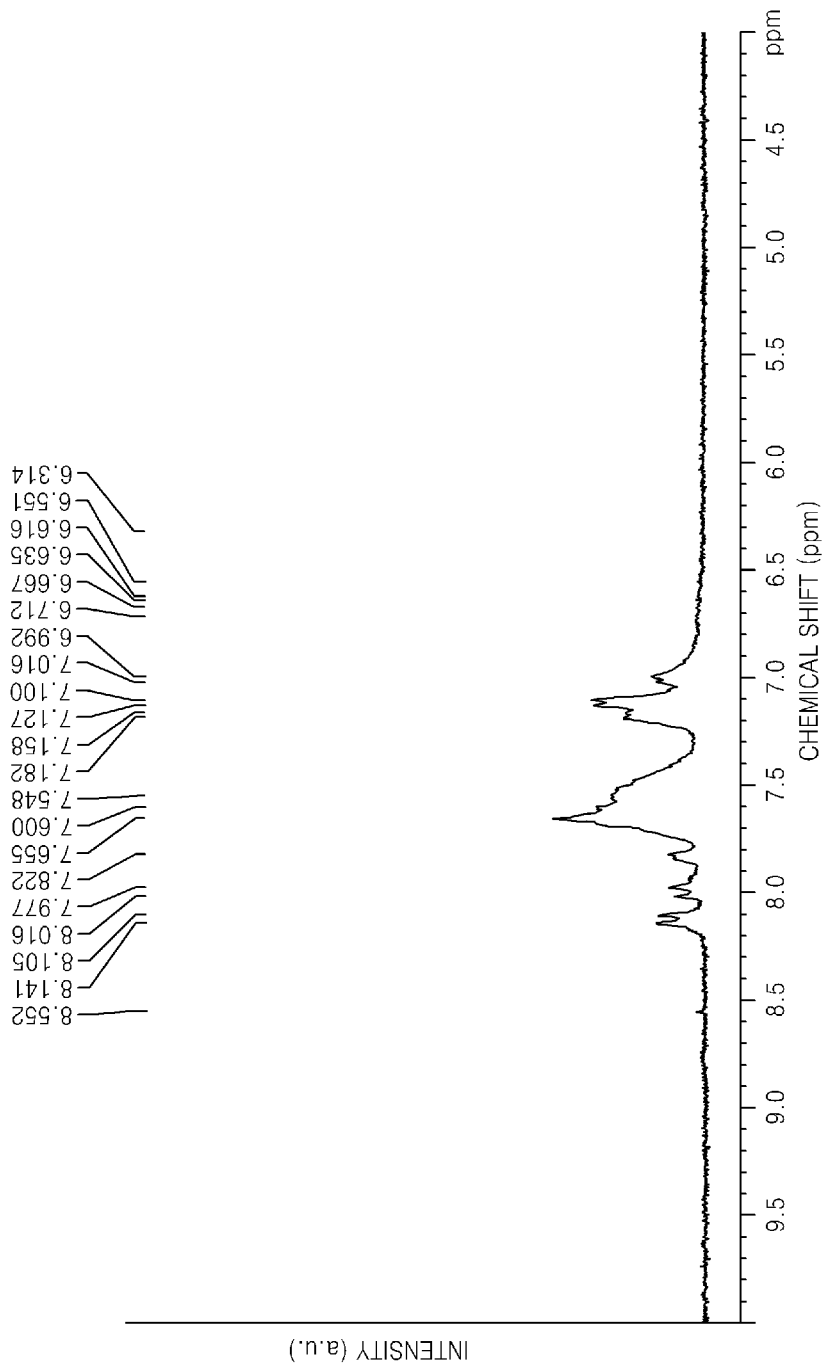
Figure 8:
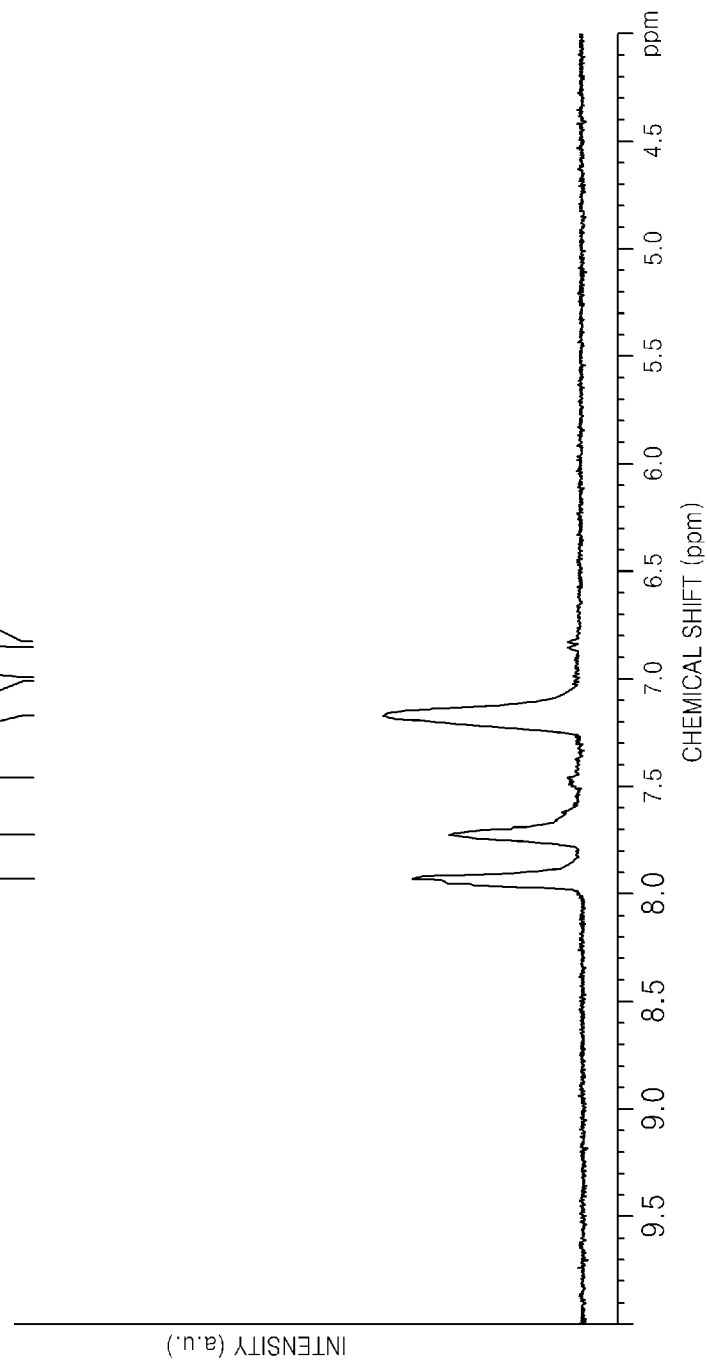
Figure 9:
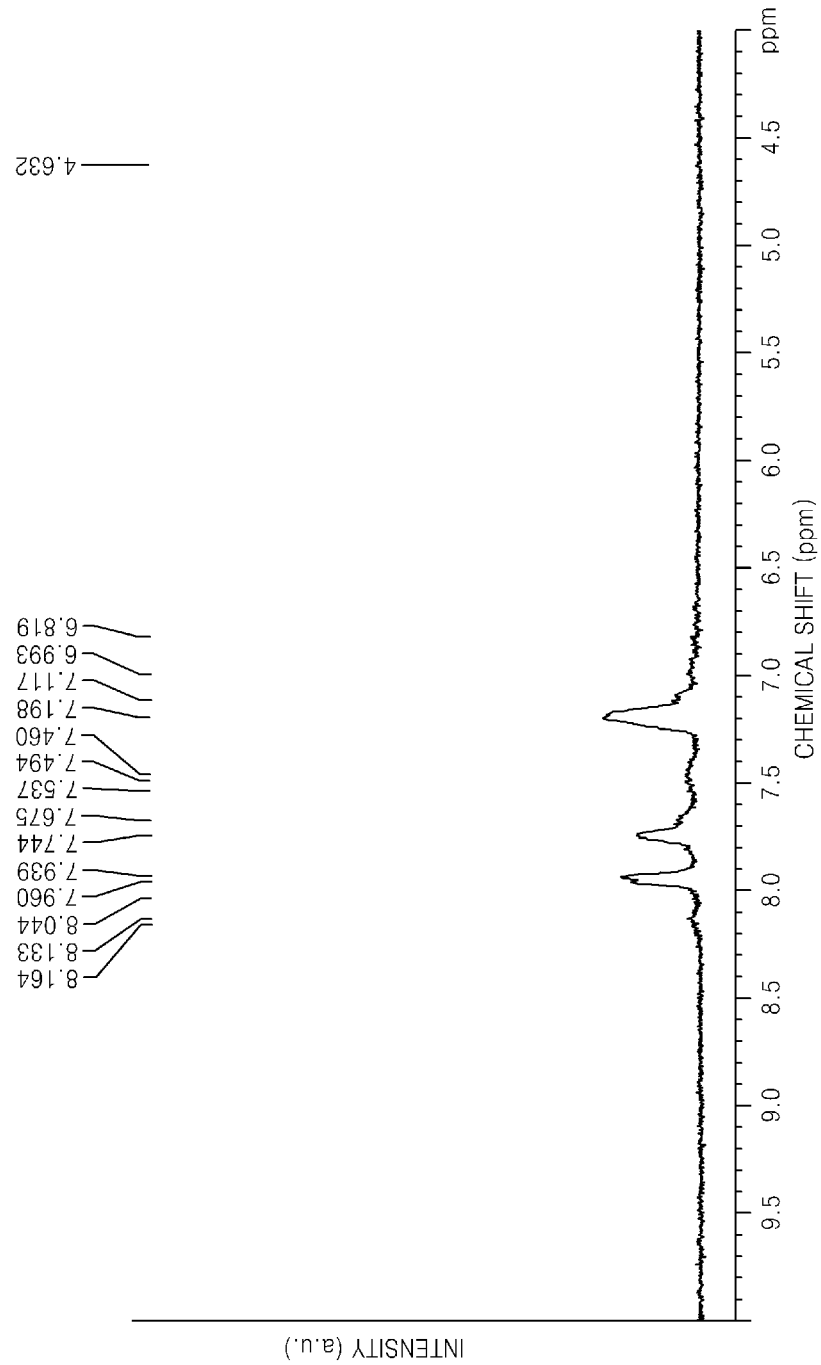
Figure 10:
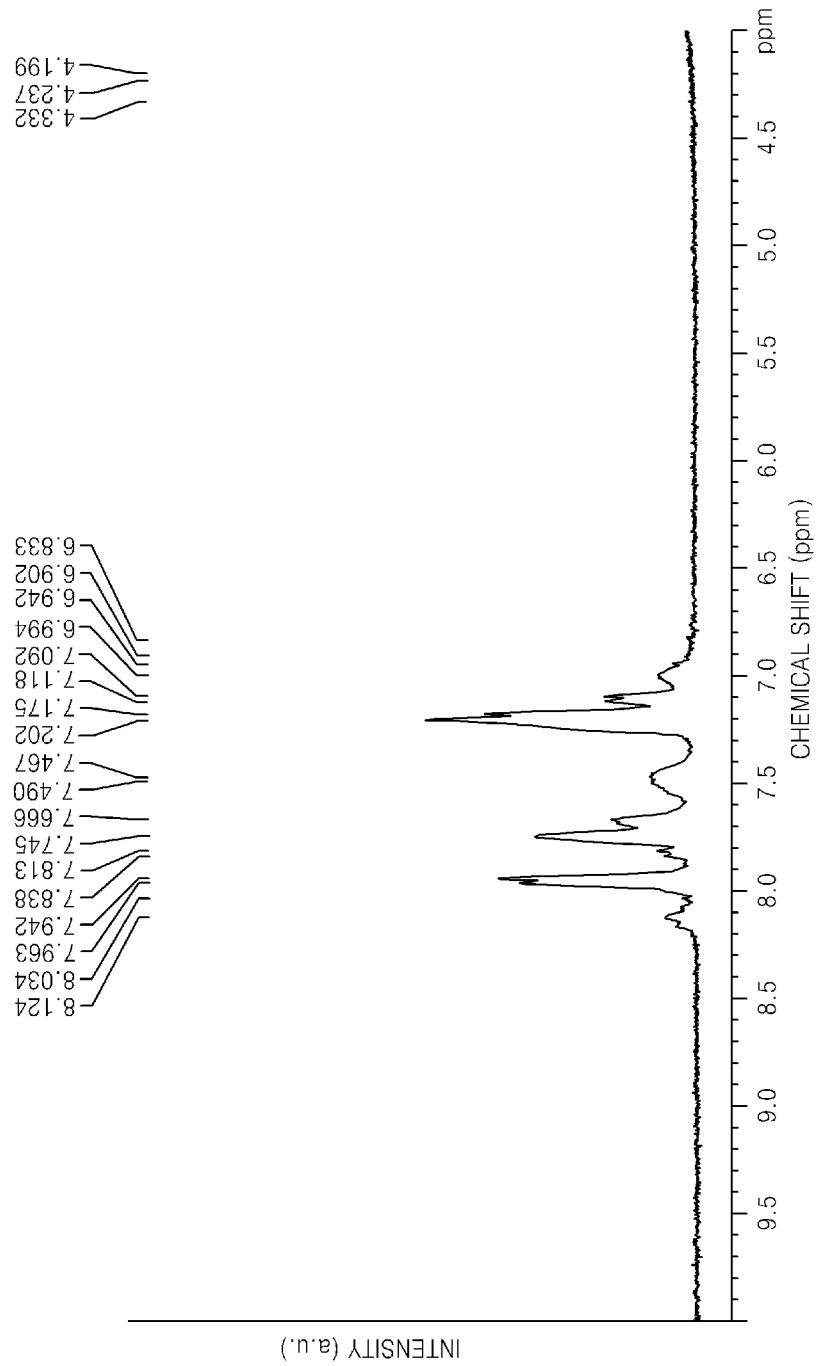
Figure 11:
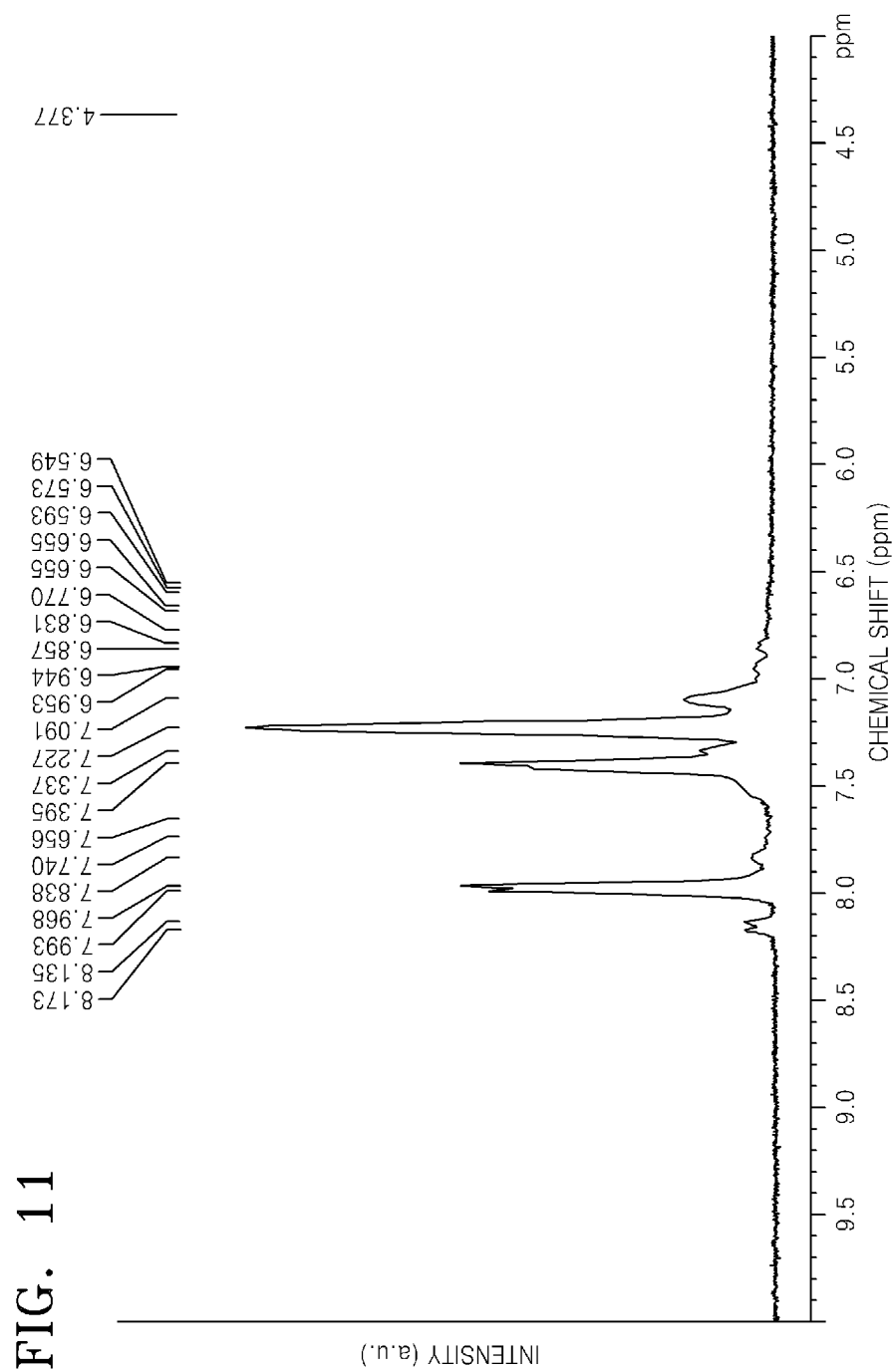

After being immersed in a 2N aqueous sulfuric acid solution at about 90° C. for about 4 hours, the electrolyte membranes of Example 6 and Comparative Example 1 were removed therefrom, and rinsed with deionized water to remove excess sulfuric acid, followed by drying to completely remove the water and conductivity measurement at about 120° C. at different relative humidity conditions. The results are shown in FIG. 4.

The conductivity measurement was performed using a 4-point probe-in-plane method in a Bekktec equipment at different relative humidity conditions, hydrogen ($H_2$) (flow rate: about 1,000 standard cubic centimeter per minute ("SCCM")) conditions at about 120° C. Referring to FIG. 4, the electrolyte membrane of Example 6 was found to have higher conductivities in high-temperature, lower humidity conditions, compared to the electrolyte membrane of Comparative Example 1.

As described above, according to the above embodiments, a composite membrane with improved thermal stability, improved mechanical characteristics, and improved ionic conductivity may be manufactured using a polymer including a repeating unit of Formula 1 or composite prepared from the polymer. A fuel cell with higher efficiency may be manufactured using the composite membrane.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:
1. A composite, which is a polymerization product of a composition comprising:
a polymer comprising a first repeating unit represented by Formula 1:

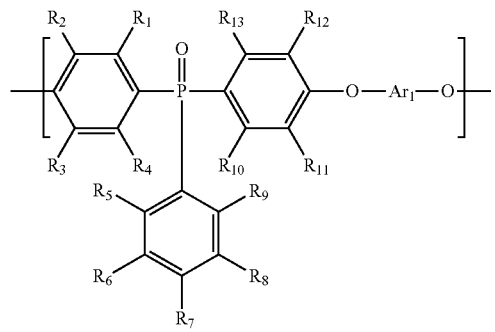

Formula 1 wherein, in Formula 1,
at least one of $R_1$ to $R_{13}$ is a proton-conducting group, and the remaining $R_1$ to $R_{13}$ are each independently selected from a hydrogen atom, a substituted or unsubstituted C1-C40 alkyl group, a substituted or unsubstituted C1-C40 alkoxy group, a substituted or unsubstituted C2-C40 alkenyl group, a substituted or unsubstituted C2-C40 alkynyl group, a substituted or unsubstituted C6-C40 aryl group, a substituted or unsubstituted C7-C40 arylalkyl group, a substituted or unsubstituted C6-C40 aryloxy group, a substituted or unsubstituted C2-C40 heteroaryl group, a substituted or unsubstituted C3-C40 heteroarylalkyl group, a substituted or unsubstituted C2-C40 heteroaryloxy group, a substituted or unsubstituted C4-C40 carbocyclic group, a substituted or unsubstituted C5-C40 carbocyclic alkyl group, a substituted or unsubstituted C4-C40 carbocyclic oxy group, a substituted or unsubstituted C5-C40 carbocyclic alkyloxy group, a substituted or unsubstituted C2-C40 heterocyclic group, a halogen atom, a hydroxy group, and a cyano group, and $Ar_1$ is a substituted or unsubstituted C6-C40 arylene group, a substituted or unsubstituted C7-C40 arylalkylene group, a substituted or unsubstituted C6-C40 arylene oxy group, a substituted or unsubstituted C7-C40 arylalkylene oxy group, a substituted or unsubstituted C2-C40 heteroarylene group, a substituted or unsubstituted C3-C40 heteroarylalkylene group, a substituted or unsubstituted C2-C40 heteroarylene oxy group, a substituted or unsubstituted C2-C40 heteroarylalkylene oxy group, a substituted or unsubstituted C4-C40 carbocyclic group, a substituted or unsubstituted C5-C40 carbocyclic alkylene group, a substituted or unsubstituted C4-C40 carbocyclic oxy group, or a substituted or unsubstituted C4-C40 carbocyclic alkylene oxy group; and at least one selected from compounds represented by Formulae 14 to 19:

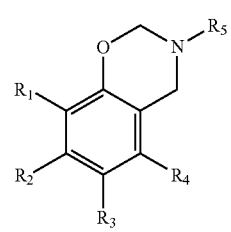

Formula 14 wherein, in Formula 14,
$R_1$, $R_2$, $R_3$, and $R_4$ are each independently a hydrogen atom, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C2-C20 heteroaryl group, a substituted or unsubstituted C2-C20 heteroaryloxy group, a substituted or unsubstituted C4-C20 carbocyclic group, a substituted or unsubstituted C4-C20 carbocyclic oxy group, a substituted or unsubstituted C2-C20 heterocyclic group, a halogen atom, a hydroxy group, or a cyano group; and $R_5$ is a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, or a substituted or unsubstituted C2-C20 heterocyclic alkyl group, Formula 15

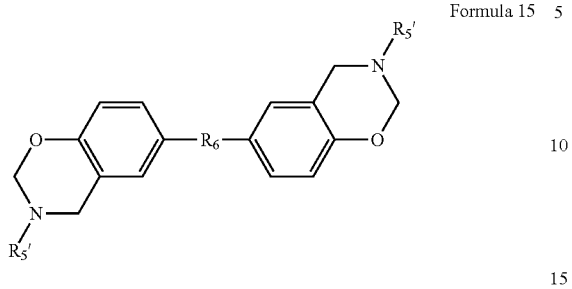

wherein, in Formula 15, $R_5'$ is a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, or a substituted or unsubstituted C2-C20 heterocyclic alkyl group; and $R_6$ is selected from a substituted or unsubstituted C1-C20 alkylene group, a substituted or unsubstituted C2-C20 alkenylene group, a substituted or unsubstituted C2-C20 alkynylene group, a substituted or unsubstituted C6-C20 arylene group, a substituted or unsubstituted C2-C20 heteroarylene group, —C(=O)—, and —SO$_2$—, Formula 16

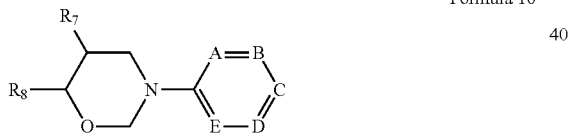

wherein, in Formula 16,

A, B, C, D, and E are carbon atoms; or
one or two of A, B, C, D, and E are nitrogen atoms, and the remaining A, B, C, D, and E are carbon atoms, $R_7$ and $R_8$ are linked to each other to form a ring, wherein the ring is a C6-C10 cycloalkyl group, a C3-C10 heteroaryl group, a fused C3-C10 heteroaryl group, a C3-C10 heterocyclic group, or a fused C3-C10 heterocyclic group, Formula 17

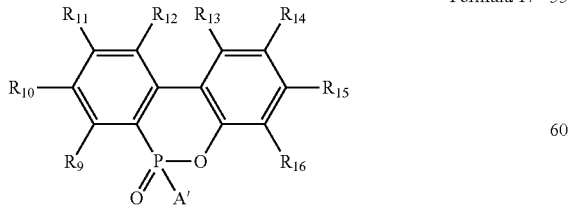

wherein, in Formula 17,

A' is a substituted or unsubstituted C1-C20 heterocyclic group, a substituted or unsubstituted C4-C20 cycloalkyl group, or a substituted or unsubstituted C1-C20 alkyl group; and $R_9$ to $R_{16}$ are each independently a hydrogen atom, C1-C20 alkyl group, a C1-C20 alkoxy group, a C6-C20 aryl group, a C6-C20 aryloxy group, a C1-C20 heteroaryl group, a C1-C20 heteroaryloxy group, a C4-C20 cycloalkyl group, a C1-C20 heterocyclic group, a halogen atom, a cyano group, or a hydroxy group, Formula 18

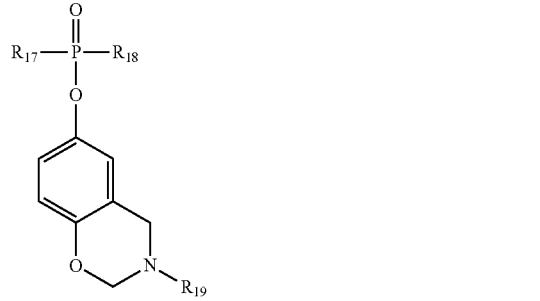

wherein, in Formula 18, $R_{17}$ and $R_{18}$ are each independently a C1-C20 alkyl group, a C1-C20 alkoxy group, a C6-C20 aryl group, a C6-C20 aryloxy group, or a group represented by Formula 8A, Formula 18a

wherein, in Formulae 18 and 18a, $R_{19}$ and $R_{19'}$ are each independently a hydrogen atom, a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 cycloalkyl group, a halogenated C4-C20 cycloalkyl group, a C1-C20 heterocyclic group, or a halogenated C1-C20 heterocyclic group, Formula 19

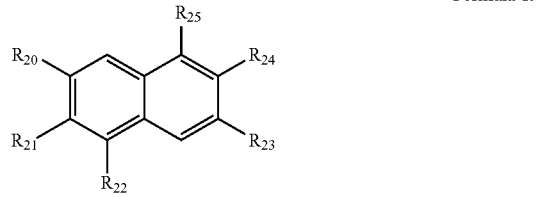

wherein, in Formula 19, at least two groups selected from $R_{20}$, $R_{21}$, and $R_{22}$ are linked to each other to form a group represented by Formula 19a, the remaining $R_{20}$, $R_{21}$, and $R_{22}$ are each independently a hydrogen atom, a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 carbocyclic group, a halogenated C4-C20 carbocyclic group, a C1-C20 heterocyclic group, or a halogenated C1-C20 heterocyclic group, at least two adjacent groups selected from $R_{23}$, $R_{24}$, and $R_{25}$ are linked to each other to form a group represented by Formula 19a, and the remaining $R_{23}$, $R_{24}$, and $R_{25}$ are each independently a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 carbocyclic group, a halogenated C4-C20 carbocyclic group, a C1-C20 heterocyclic group, or a halogenated C1-C20 heterocyclic group,

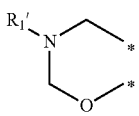

Formula 19a wherein, in Formula 19a, $R_1'$ is a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, or a substituted or unsubstituted C2-C20 heterocyclic alkyl group, and

* indicates a binding site to at least two adjacent groups of $R_{20}$, $R_{21}$, and $R_{22}$ in Formula 19, and a binding site to at least two adjacent groups of $R_{23}$, $R_{24}$, and $R_{25}$ in Formula 19.

2. The composite of claim 1, wherein the polymer further comprises a second repeating unit represented by Formula 2, wherein the first repeating unit and the second repeating unit each have a mole fraction from about 0.01 to about 0.99, and a sum of the mole fractions of the first repeating unit and the second repeating unit is equal to 1:

Formula 2 wherein, in Formula 2,

A and $Ar_2$ are each independently a substituted or unsubstituted C6-C40 arylene group, a substituted or unsubstituted C7-C40 arylalkylene group, a substituted or unsubstituted C6-C40 arylene oxy group, a substituted or unsubstituted C7-C40 arylalkylene oxy group, a substituted or unsubstituted C2-C40 heteroarylene group, a substituted or unsubstituted C3-C40 heteroarylalkylene group, a substituted or unsubstituted C2-C40 heteroarylene oxy group, a substituted or unsubstituted C2-C40 heteroarylalkylene oxy group, a substituted or unsubstituted C4-C40 carbocyclic group, a substituted or unsubstituted C5-C40 carbocyclic alkylene group, a substituted or unsubstituted C4-C40 carbocyclic oxy group, or a substituted or unsubstituted C4-C40 carbocyclic alkylene oxy group.

3. The composite of claim 1, wherein the polymer is represented by Formula 3a, Formula 4a, or Formula 5a:

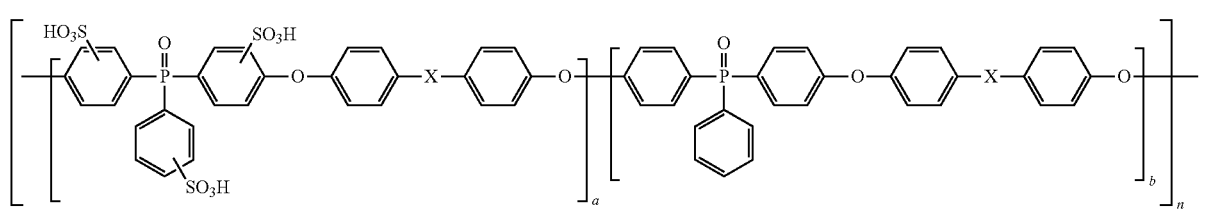

Formula 3a wherein, in Formula 3a,

X is a chemical bond, —$CH_2$—, —$C(CF_3)_2$—, —C(=O)—, —$C(CCl_3)_2$—, —$CH(CF_3)$—, —S(=O)—, —$S(=O)_2$—, —P(=O)$C_6H_5$—, or —$CH(CCl_3)$—;

$0.01 \leq a \leq 0.99$; and $0.01 \leq b \leq 0.99$, wherein a+b=1; and n, which is a degree of polymerization, is from about 5 to about 5,000,

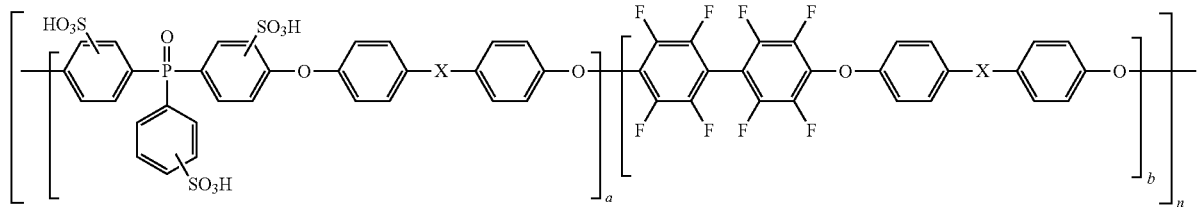

Formula 4a wherein, in Formula 4a,
X is a chemical bond, —CH$_2$—, —C(CF$_3$)$_2$—, —C(=O)—, —C(CCl$_3$)$_2$—, —CH(CF$_3$)—, —S(=O)—, —S(=O)$_2$—, —P(=O)C$_6$H$_5$—, or —CH(CCl$_3$)—;
0.01 ≤ a ≤ 0.99; and
0.01 ≤ b ≤ 0.99,
wherein a+b=1; and
n, which is a degree of polymerization, is from about 5 to about 5,000,

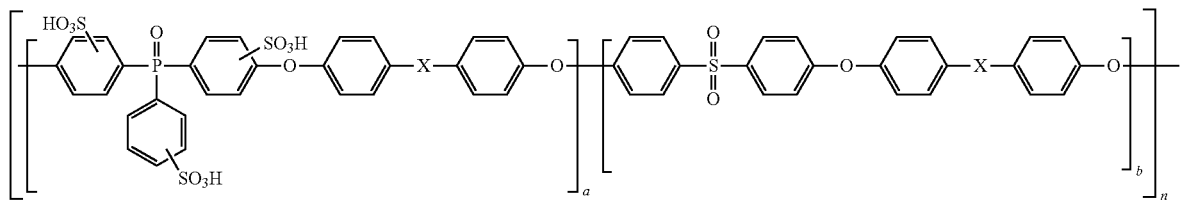

Formula 5a wherein, in Formula 5a,
X is a chemical bond, —CH$_2$—, —C(CF$_3$)$_2$—, —C(=O)—, —C(CCl$_3$)$_2$—, —CH(CF$_3$)—, —S(=O)—, —S(=O)$_2$—, —P(=O)C$_6$H$_5$—, or —CH(CCl$_3$)—;
0.01 ≤ a ≤ 0.99; and
0.01 ≤ b ≤ 0.99,
wherein a+b=1; and
n, which is a degree of polymerization, is from about 5 to about 5,000.

4. A composite membrane comprising:
a polymer comprising a first repeating unit represented by Formula 1:

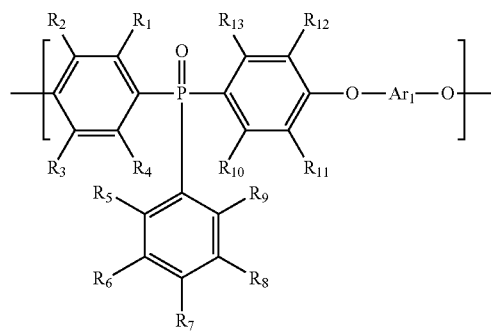

Formula 1 wherein, in Formula 1,
at least one of R$_1$ to R$_{13}$ is a proton-conducting group, and the remaining R$_1$ to R$_{13}$ are each independently selected from a hydrogen atom, a substituted or unsubstituted C1-C40 alkyl group, a substituted or unsubstituted C1-C40 alkoxy group, a substituted or unsubstituted C2-C40 alkenyl group, a substituted or unsubstituted C2-C40 alkynyl group, a substituted or unsubstituted C6-C40 aryl group, a substituted or unsubstituted C7-C40 arylalkyl group, a substituted or unsubstituted C6-C40 aryloxy group, a substituted or unsubstituted C2-C40 heteroaryl group, a substituted or unsubstituted C3-C40 heteroarylalkyl group, a substituted or unsubstituted C2-C40 heteroaryloxy group, a substituted or unsubstituted C4-C40 carbocyclic group, a substituted or unsubstituted C5-C40 carbocyclic alkyl group, a substituted or unsubstituted C4-C40 carbocyclic oxy group, a substituted or unsubstituted C5-C40 carbocyclic alkyloxy group, a substituted or unsubstituted C2-C40 heterocyclic group, a halogen atom, a hydroxy group, and a cyano group, and Ar$_1$ is a substituted or unsubstituted C6-C40 arylene group, a substituted or unsubstituted C7-C40 arylalkylene group, a substituted or unsubstituted C6-C40 arylene oxy group, a substituted or unsubstituted C7-C40 arylalkylene oxy group, a substituted or unsubstituted C2-C40 heteroarylene group, a substituted or unsubstituted C3-C40 heteroarylalkylene group, a substituted or unsubstituted C2-C40 heteroarylene oxy group, a substituted or unsubstituted C2-C40 heteroarylalkylene oxy group, a substituted or unsubstituted C4-C40 carbocyclic group, a substituted or unsubstituted C5-C40 carbocyclic alkylene group, a substituted or unsubstituted C4-C40 carbocyclic oxy group, or a substituted or unsubstituted C4-C40 carbocyclic alkylene oxy group; or a composite, which is a polymerization product of a composition comprising the polymer; and
at least one selected from compounds represented by Formulae 14 to 19:

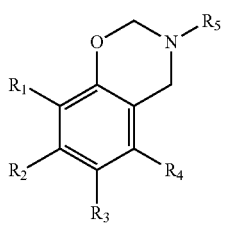

Formula 14 wherein, in Formula 14, $R_1$, $R_2$, $R_3$, and $R_4$ are each independently a hydrogen atom, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C2-C20 heteroaryl group, a substituted or unsubstituted C2-C20 heteroaryloxy group, a substituted or unsubstituted C4-C20 carbocyclic group, a substituted or unsubstituted C4-C20 carbocyclic oxy group, a substituted or unsubstituted C2-C20 heterocyclic group, a halogen atom, a hydroxy group, or a cyano group; and $R_5$ is a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, or a substituted or unsubstituted C2-C20 heterocyclic alkyl group,

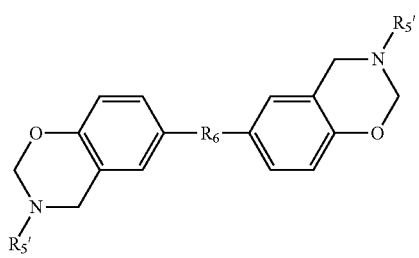

Formula 15 wherein, in Formula 15, $R_5'$ is a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, or a substituted or unsubstituted C2-C20 heterocyclic alkyl group; and $R_6$ is selected from a substituted or unsubstituted C1-C20 alkylene group, a substituted or unsubstituted C2-C20 alkenylene group, a substituted or unsubstituted C2-C20 alkynylene group, a substituted or unsubstituted C6-C20 arylene group, a substituted or unsubstituted C2-C20 heteroarylene group, —C(=O)—, and —SO$_2$—,

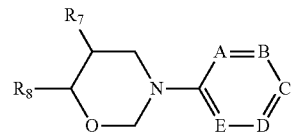

Formula 16 wherein, in Formula 16,

A, B, C, D, and E are carbon atoms; or one or two of A, B, C, D, and E are nitrogen atoms, and the remaining A, B, C, D, and E are carbon atoms, $R_7$ and $R_8$ are linked to each other to form a ring, wherein the ring is a C6-C10 cycloalkyl group, a C3-C10 heteroaryl group, a fused C3-C10 heteroaryl group, a C3-C10 heterocyclic group, or a fused C3-C10 heterocyclic group,

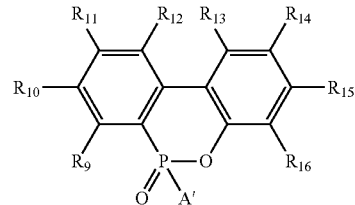

Formula 17 wherein, in Formula 17,

A' is a substituted or unsubstituted C1-C20 heterocyclic group, a substituted or unsubstituted C4-C20 cycloalkyl group, or a substituted or unsubstituted C1-C20 alkyl group; and $R_9$ to $R_{16}$ are each independently a hydrogen atom, C1-C20 alkyl group, a C1-C20 alkoxy group, a C6-C20 aryl group, a C6-C20 aryloxy group, a C1-C20 heteroaryl group, a C1-C20 heteroaryloxy group, a C4-C20 cycloalkyl group, a C1-C20 heterocyclic group, a halogen atom, a cyano group, or a hydroxy group,

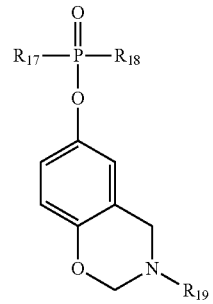

Formula 18 wherein, in Formula 18, $R_{17}$ and $R_{18}$ are each independently a C1-C20 alkyl group, a C1-C20 alkoxy group, a C6-C20 aryl group, a C6-C20 aryloxy group, or a group represented by Formula 8A, Formula 18a

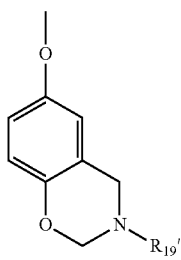

wherein, in Formulae 18 and 18a, $R_{19}$ and $R_{19'}$ are each independently a hydrogen atom, a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 cycloalkyl group, a halogenated C4-C20 cycloalkyl group, a C1-C20 heterocyclic group, or a halogenated C1-C20 heterocyclic group, Formula 19

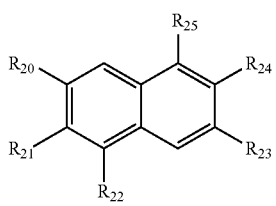

wherein, in Formula 19, at least two groups selected from $R_{20}$, $R_{21}$, and $R_{22}$ are linked to each other to form a group represented by Formula 19a, the remaining $R_{20}$, $R_{21}$, and $R_{22}$ are each independently a hydrogen atom, a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 carbocyclic group, a halogenated C4-C20 carbocyclic group, a C1-C20 heterocyclic group, or a halogenated C1-C20 heterocyclic group, at least two adjacent groups selected from $R_{23}$, $R_{24}$, and $R_{25}$ are linked to each other to form a group represented by Formula 19a, and the remaining $R_{23}$, $R_{24}$, and $R_{25}$ is each independently a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 carbocyclic group, a halogenated C4-C20 carbocyclic group, a C1-C20 heterocyclic group, or a halogenated C1-C20 heterocyclic group, Formula 19a

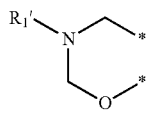

wherein, in Formula 19a, $R_1'$ is a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, or a substituted or unsubstituted C2-C20 heterocyclic alkyl group, and

* indicates a binding site to at least two adjacent groups of $R_{20}$, $R_{21}$, and $R_{22}$ in Formula 19, and a binding site to at least two adjacent groups of $R_{23}$, $R_{24}$, and $R_{25}$ in Formula 19.

5. The composite membrane of claim 4, wherein the polymer further comprises a second repeating unit represented by Formula 2, wherein the first repeating unit and the second repeating unit each have a mole fraction from about 0.01 to about 0.99, and a sum of the mole fractions of the first repeating unit and the second repeating unit is equal to 1, Formula 2

wherein, in Formula 2,

A and $Ar_2$ are each independently a substituted or unsubstituted C6-C40 arylene group, a substituted or unsubstituted C7-C40 arylalkylene group, a substituted or unsubstituted C6-C40 arylene oxy group, a substituted or unsubstituted C7-C40 arylalkylene oxy group, a substituted or unsubstituted C2-C40 heteroarylene group, a substituted or unsubstituted C3-C40 heteroarylalkylene group, a substituted or unsubstituted C2-C40 heteroarylene oxy group, a substituted or unsubstituted C2-C40 heteroarylalkylene oxy group, a substituted or unsubstituted C4-C40 carbocyclic group, a substituted or unsubstituted C5-C40 carbocyclic alkylene group, a substituted or unsubstituted C4-C40 carbocyclic oxy group, or a substituted or unsubstituted C4-C40 carbocyclic alkylene oxy group.

6. The composite membrane of claim 4, wherein the polymer is represented by Formula 3a, Formula 4a, or Formula 5a:

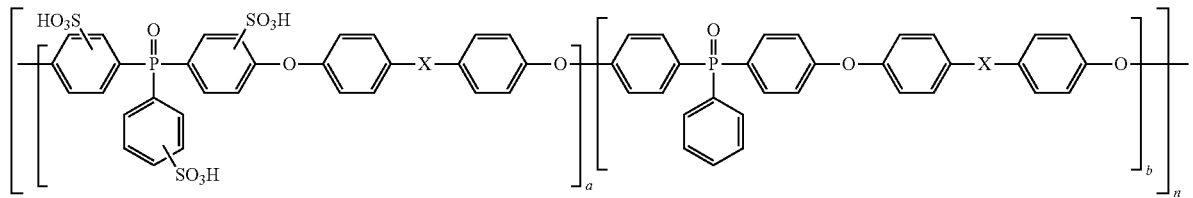

Formula 3a wherein, in Formula 3a,
X is a chemical bond, —$CH_2$—, —$C(CF_3)_2$—, —C(=O)—, —$C(CCl_3)_2$—, —$CH(CF_3)$—, —S(=O)—, —$S(=O)_2$—, —$P(=O)C_6H_5$—, or —$CH(CCl_3)$—;
$0.01 \leq a \leq 0.99$; and
$0.01 \leq b \leq 0.99$,
wherein $a+b=1$; and
n, which is a degree of polymerization is from about 5 to about 5,000:

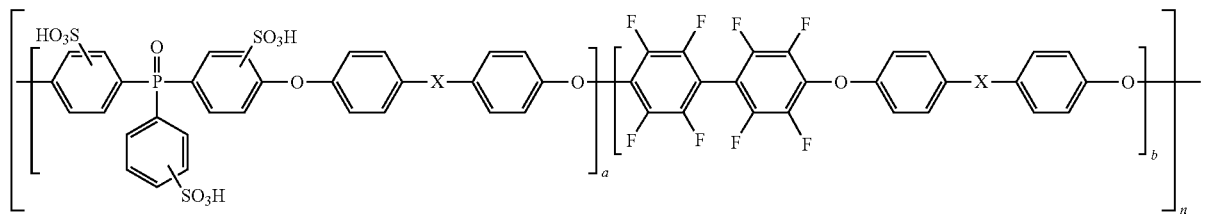

Formula 4a wherein, in Formula 4a,
X is a chemical bond, —$CH_2$—, —$C(CF_3)_2$—, —C(=O)—, —$C(CCl_3)_2$—, —$CH(CF_3)$—, —S(=O)—, —$S(=O)_2$—, —$P(=O)C_6H_5$—, or —$CH(CCl_3)$—;
$0.01 \leq a \leq 0.99$; and
$0.01 \leq b \leq 0.99$, wherein $a+b=1$;
N, which is a degree of polymerization, is from about 5 to about 5,000, and

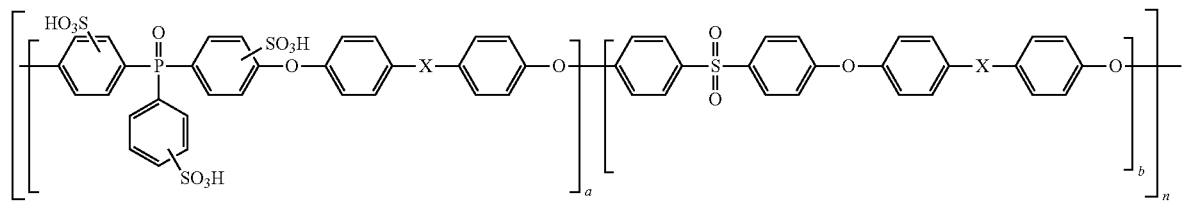

Formula 5a wherein, in Formula 5a,
X is a chemical bond, —$CH_2$—, —$C(CF_3)_2$—, —C(=O)—, —$C(CCl_3)_2$—, —$CH(CF_3)$—, —S(=O)—, —$S(=O)_2$—, —$P(=O)C_6H_5$—, or —$CH(CCl_3)$—;

$0.01 \leq a \leq 0.99$; and
$0.01 \leq b \leq 0.99$,
wherein $a+b=1$; and
n, which is a degree of polymerization, is from about 5 to about 5,000.

\* \* \* \* \*